United States Patent
Hagiwara et al.

(10) Patent No.: US 10,448,299 B2
(45) Date of Patent: *Oct. 15, 2019

(54) METHOD AND SYSTEM FOR REALIZING FUNCTION BY CAUSING ELEMENTS OF HARDWARE TO PERFORM LINKAGE OPERATION

(71) Applicant: Sony Corporation, Tokyo (JP)

(72) Inventors: Takehiro Hagiwara, Kanagawa (JP); Hiroyuki Masuda, Kanagawa (JP); Genta Kondo, Kanagawa (JP); Hiromu Takizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,091

(22) Filed: Oct. 17, 2018

(65) Prior Publication Data
US 2019/0075500 A1   Mar. 7, 2019

Related U.S. Application Data

(63) Continuation of application No. 16/008,770, filed on Jun. 14, 2018, now Pat. No. 10,142,901, which is a (Continued)

(30) Foreign Application Priority Data

May 15, 2014   (JP) ................................ 2014-101507

(51) Int. Cl.
*H04W 36/00*  (2009.01)
*H04W 36/14*  (2009.01)
(Continued)

(52) U.S. Cl.
CPC .......... *H04W 36/14* (2013.01); *G06F 9/5044* (2013.01); *G06F 9/5077* (2013.01); *H04L 67/42* (2013.01);
(Continued)

(58) Field of Classification Search
CPC ...... G06Q 30/00; G06Q 30/02; G06Q 10/063; G06Q 10/0637; G06Q 10/0639;
(Continued)

(56) References Cited

U.S. PATENT DOCUMENTS 6,437,692 B1 * 8/2002  Petite ................. G01D 4/004
                                                                    340/540
6,601,233 B1 * 7/2003  Underwood .......... G06F 8/24
                                                                    717/100
(Continued)

FOREIGN PATENT DOCUMENTS

CN   201654979 U   * 11/2010
JP   2002-56163 A     2/2002
(Continued)

OTHER PUBLICATIONS

European Office Action dated Aug. 15, 2018 in European Application No. 157267 44.4-1221.
(Continued)

*Primary Examiner* — Mahendra R Patel
(74) *Attorney, Agent, or Firm* — Xsensus LLP

(57) ABSTRACT

A system that stores functional information indicating a capability of each of a plurality of elements located remotely from the system; identifies a function capable of being performed by linking a plurality of the elements based on the stored functional information; and transmits information corresponding to the identified function capable of being performed by linking the plurality of elements to a first device remote from the system.

23 Claims, 27 Drawing Sheets

Related U.S. Application Data continuation of application No. 15/123,171, filed as application No. PCT/JP2015/002360 on May 8, 2015, now Pat. No. 10,021,612.

(51) Int. Cl.

| | | |
|---|---|---|
| *H04W 4/70* | (2018.01) | |
| *H04W 4/80* | (2018.01) | |
| *G06F 9/50* | (2006.01) | |
| *H04L 29/06* | (2006.01) | |
| *H04W 48/16* | (2009.01) | |
| *H04W 84/12* | (2009.01) | |
| *H04W 88/06* | (2009.01) | |

(52) U.S. Cl.
CPC ............... *H04W 4/70* (2018.02); *H04W 4/80* (2018.02); *H04W 48/16* (2013.01); *H04W 84/12* (2013.01); *H04W 88/06* (2013.01)

(58) Field of Classification Search
CPC ......... G06Q 10/06393; G06Q 30/0201; G06Q 10/0631; G06Q 30/0641; G06T 11/20; G06T 30/02; G06T 11/206; G06F 15/177; G06F 17/30536; G06F 8/00; H04L 63/10; H04L 12/751; H04L 29/06; H04W 52/0216; H04W 84/18; H04W 48/08; H04W 4/24; H04W 8/02; H04W 4/00; H04W 36/14; H04W 48/16; Y02D 70/22; Y02D 70/164; Y02D 70/1224; Y04S 10/54
USPC ....... 455/436, 406; 370/255; 705/7.29, 7.38, 705/27.1
See application file for complete search history.

(56) References Cited

U.S. PATENT DOCUMENTS

| | | | | |
|---|---|---|---|---|
| 7,020,501 | B1* | 3/2006 | Elliott | H04W 52/0216 455/574 |
| 7,076,211 | B2 | 7/2006 | Donner | |
| 7,561,544 | B2* | 7/2009 | Ganesh | G01D 21/00 370/328 |
| 7,564,805 | B1* | 7/2009 | Cortez | H04L 41/0896 370/255 |
| 7,761,591 | B2* | 7/2010 | Graham | G06Q 40/02 709/204 |
| 8,380,817 | B2* | 2/2013 | Okada | H04L 63/10 709/201 |
| 8,392,229 | B2 | 3/2013 | Macbeth et al. | |
| 8,452,906 | B2* | 5/2013 | Grohman | G05B 15/02 710/105 |
| 9,185,654 | B2 | 11/2015 | Holeman | |
| 2003/0144868 | A1* | 7/2003 | MacIntyre | G06Q 10/063 705/7.38 |
| 2005/0091647 | A1* | 4/2005 | McCollum | G06F 8/20 717/130 |
| 2006/0166643 | A1* | 7/2006 | Puthenpura | H04L 12/2854 455/406 |
| 2006/0282436 | A1* | 12/2006 | Chaudhuri | G06F 16/2462 |
| 2006/0291473 | A1* | 12/2006 | Chase | H04L 43/12 370/395.5 |
| 2006/0293933 | A1* | 12/2006 | Millhouse | G06Q 10/06 705/7.27 |
| 2007/0168885 | A1* | 7/2007 | Muller | G06Q 10/06 715/853 |
| 2007/0299712 | A1* | 12/2007 | Macbeth | G06F 8/00 705/7.27 |
| 2010/0283586 | A1 | 11/2010 | Ikeda | |
| 2011/0156879 | A1 | 6/2011 | Matsushita | |
| 2011/0179104 | A1 | 7/2011 | Hakoda | |
| 2011/0264484 | A1* | 10/2011 | Macbeth | G06F 8/00 705/7.29 |
| 2012/0311530 | A1* | 12/2012 | Graviers | G06F 8/447 717/107 |
| 2012/0331438 | A1 | 12/2012 | Moskal | |
| 2013/0159021 | A1* | 6/2013 | Felsher | G06F 19/328 705/3 |
| 2013/0311610 | A1 | 11/2013 | Kim | |
| 2014/0328216 | A1 | 11/2014 | Coustal | |
| 2015/0181407 | A1* | 6/2015 | El Moumouhi | H04W 48/18 455/406 |

FOREIGN PATENT DOCUMENTS

| | | | | |
|---|---|---|---|---|
| JP | 2009-533138 | A | 9/2009 | |
| JP | 2010-279498 | A | 12/2010 | |
| JP | 2012-208747 | A | 10/2012 | |
| JP | 2013-92997 | A | 5/2013 | |
| JP | 2013-531839 | A | 8/2013 | |
| WO | 2006073025 | A1 | 7/2006 | |
| WO | WO-2006073025 | A1 * | 7/2006 | ............... G06N 3/02 |
| WO | WO-2015174058 | A1 * | 11/2015 | ............... H04W 4/70 |

OTHER PUBLICATIONS

Office Action dated Jun. 26, 2018 in Japanese Patent Application No. 2014-101507, with English translation.
International Search Report dated Sep. 1, 2015, in PCT/JP2015/002360 filed May 8, 2015.
Japanese Office Action dated Jan. 30, 2018 in Patent Application No. 2014-101507, with English translation.
Koji Tsukada, "Simple Middleware for Sunday Ubiquitous", Computer Software, Japan Society for Software Science and Technology, Jan. 26, 2010, vol. 27, No. 1, pp. 3-17, with English abstract, 19 pages.
European Communication Article 94(3) issued in corresponding European Application No. 15726744.4, dated Aug. 15, 2018, 9 pages.
Office Action issued in Japanese Application 2014-101507 dated Jan. 29, 2019.
Tsukada, K., et al., "Lightweight Middleware for Developing Ubiquitous Interfaces", Japan Society for Software Science and Technology, vol., 27, No. 1, 20 Pages total, (Jan. 26, 2010).

* cited by examiner

[Fig. 1]
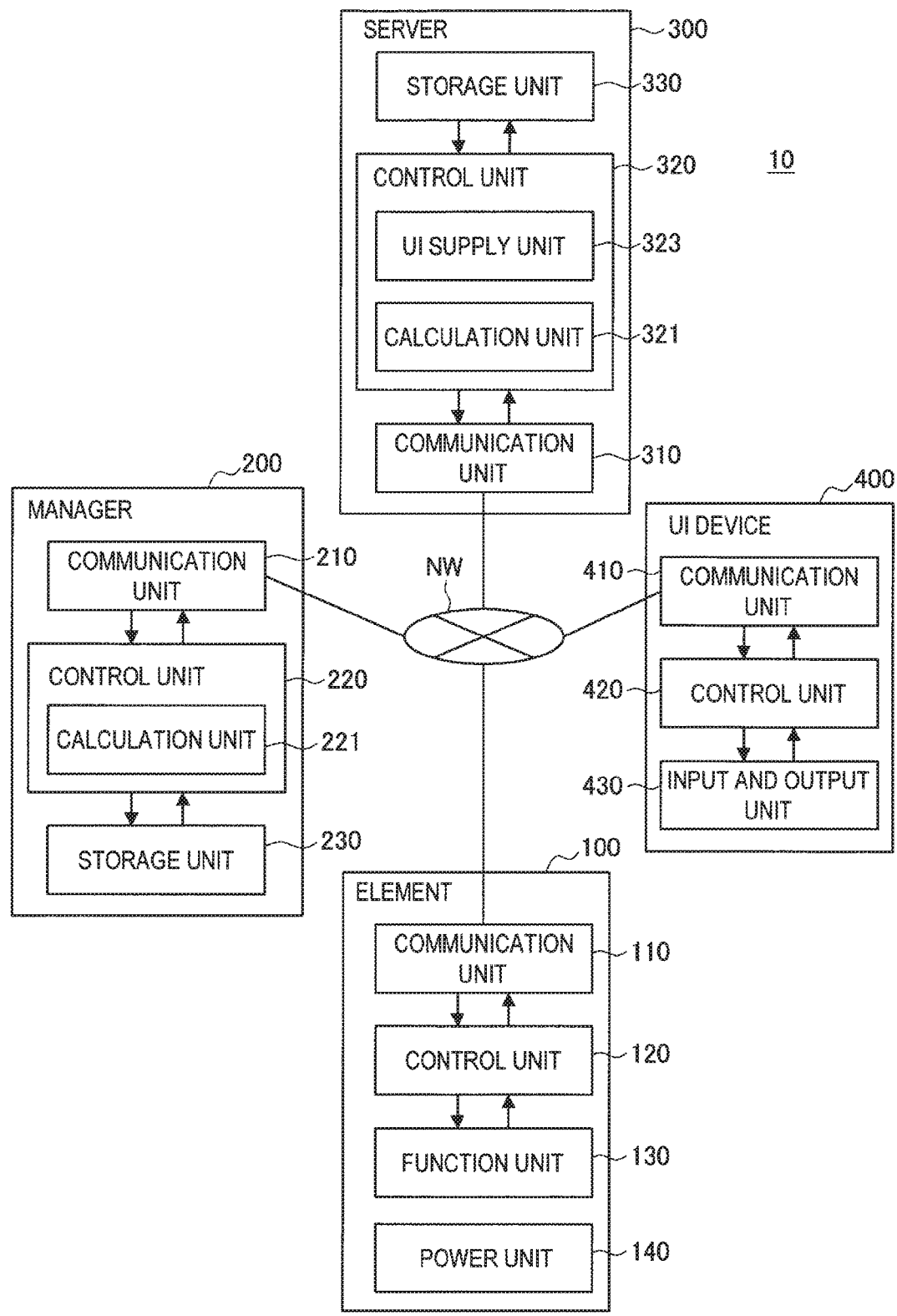

[Fig. 2]
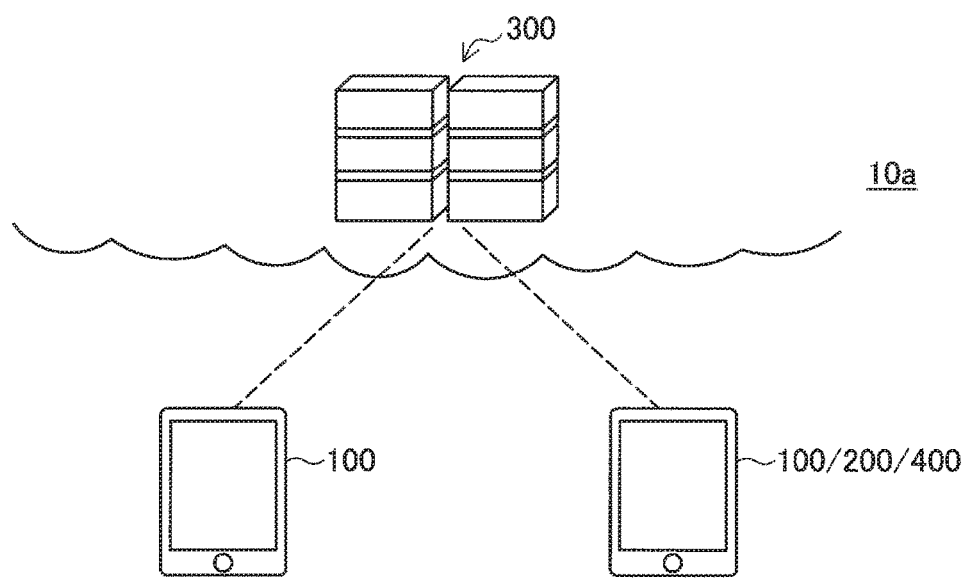

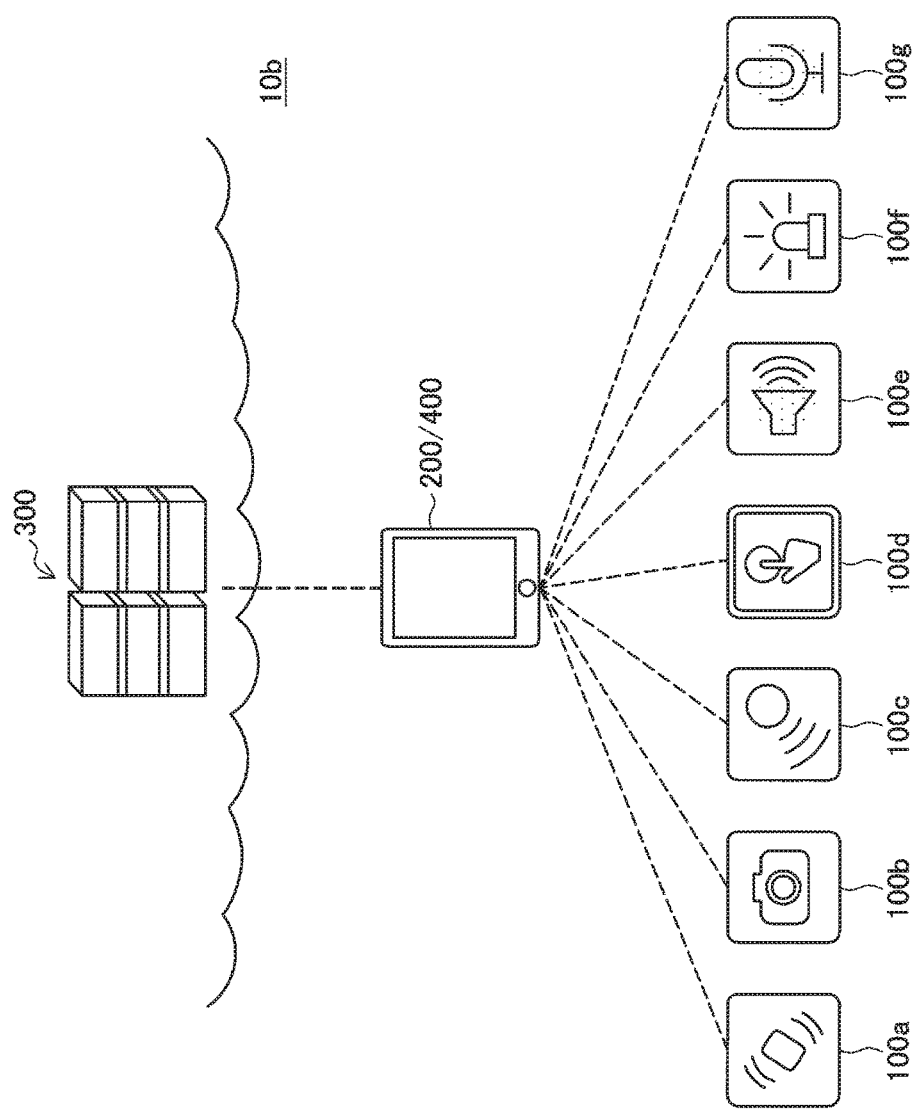

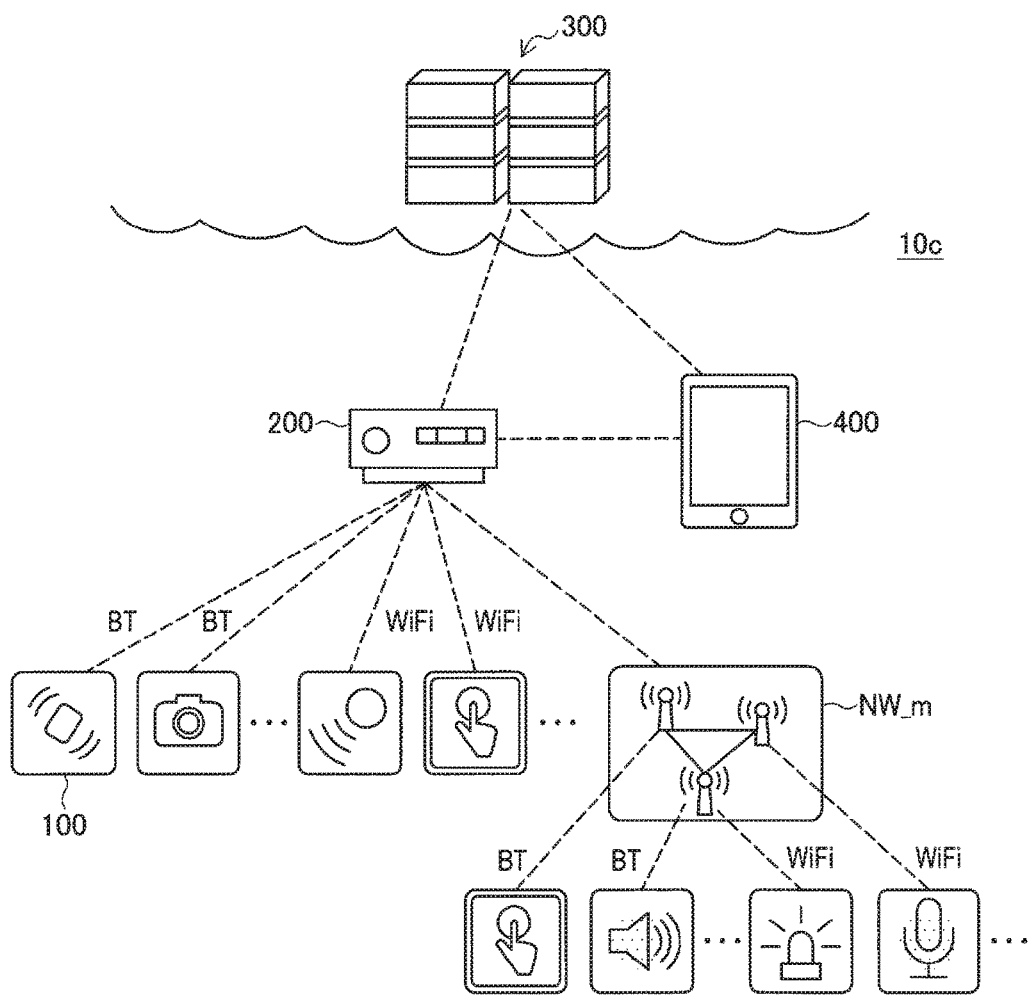
[Fig. 4]

[Fig. 5]
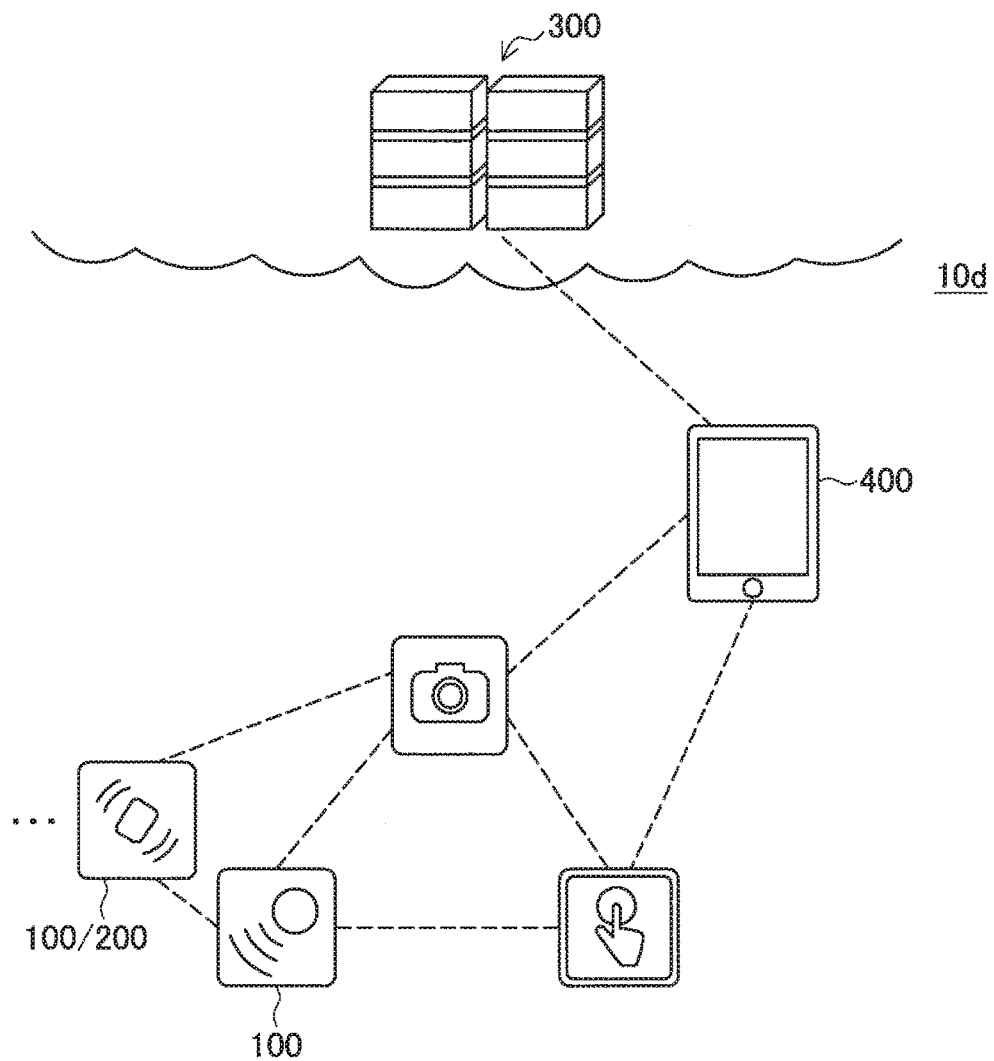

[Fig. 6]
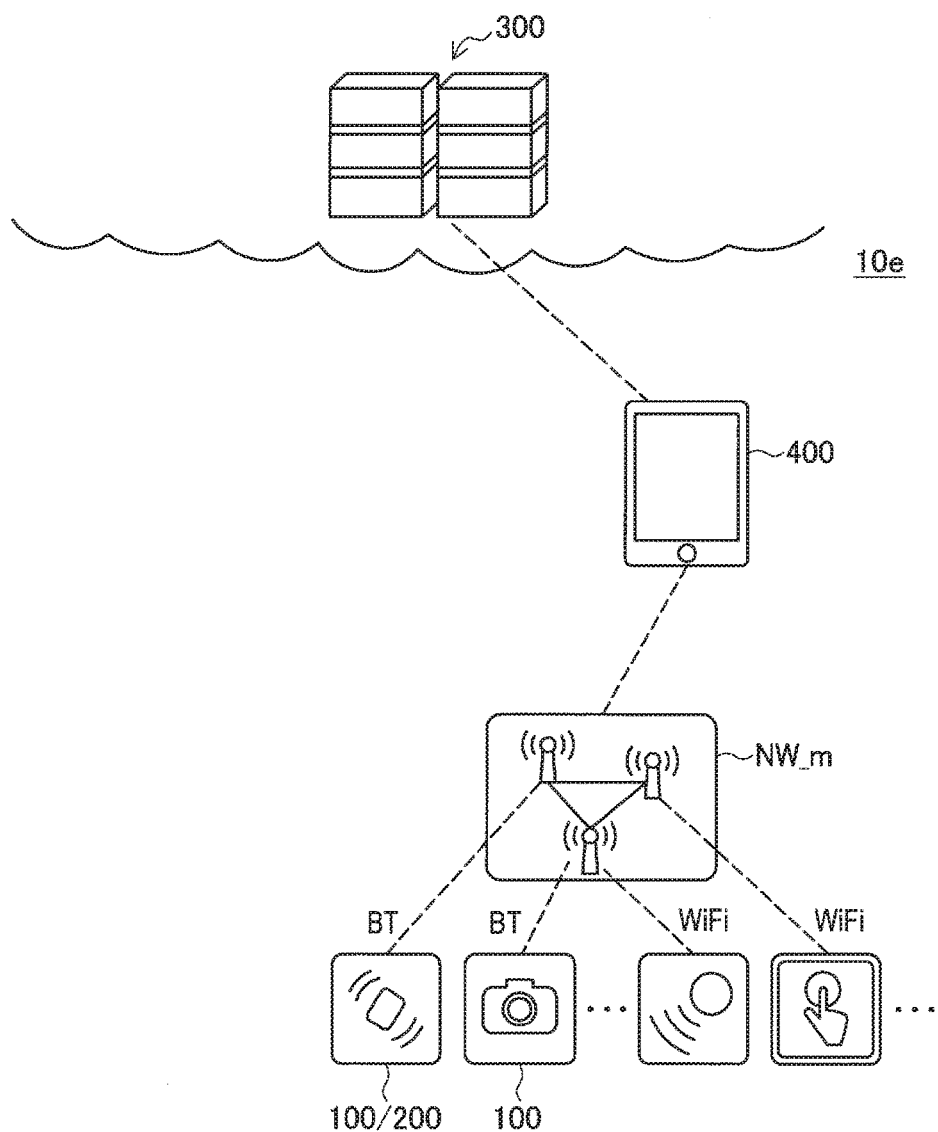

[Fig. 7]
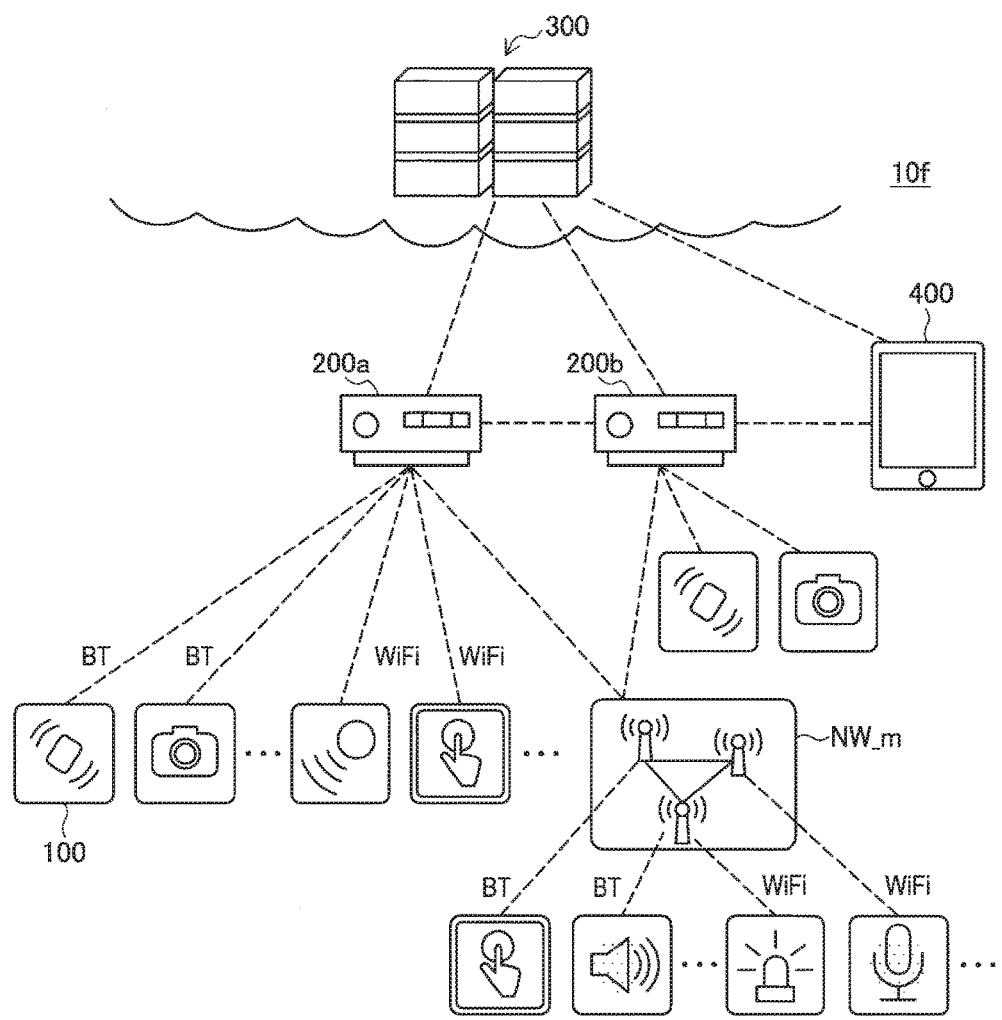

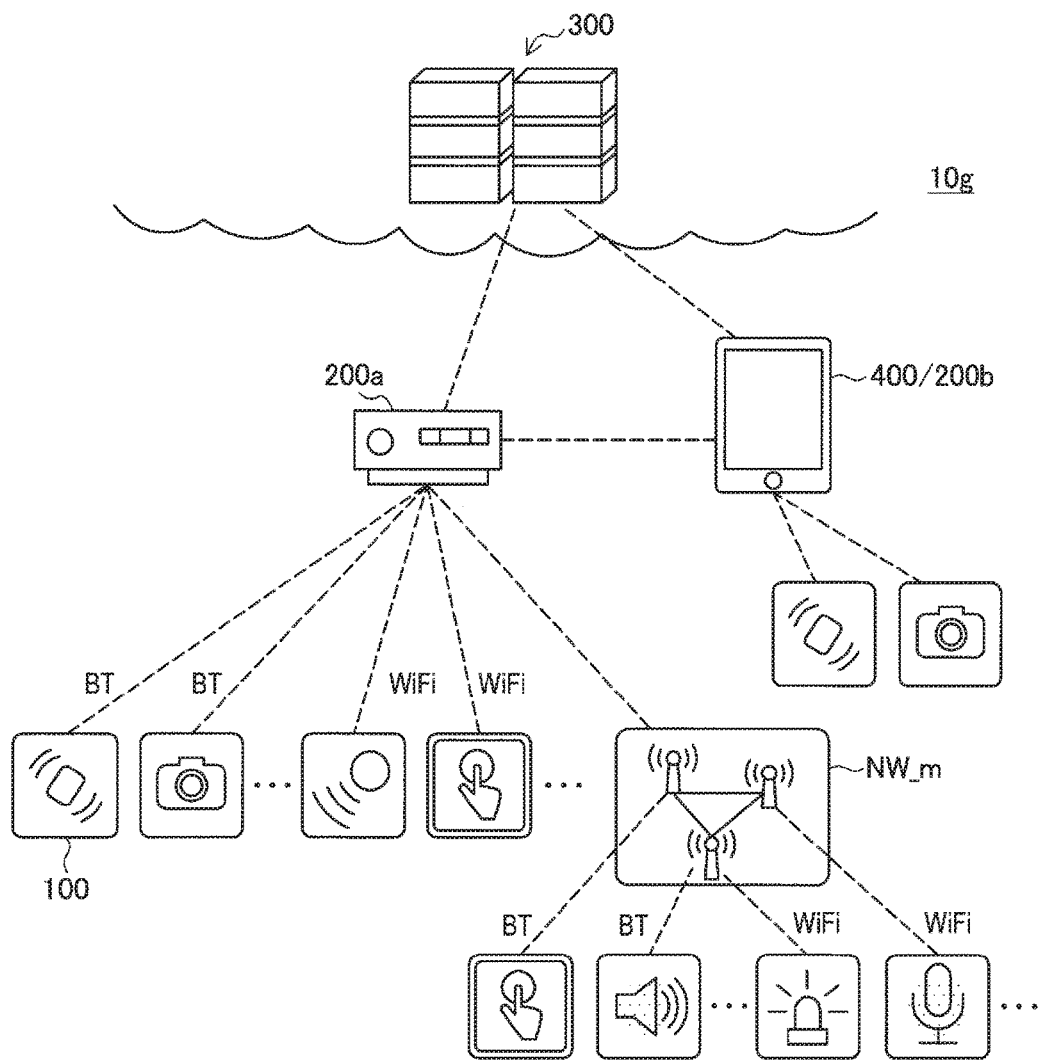
[Fig. 8]

[Fig. 9]
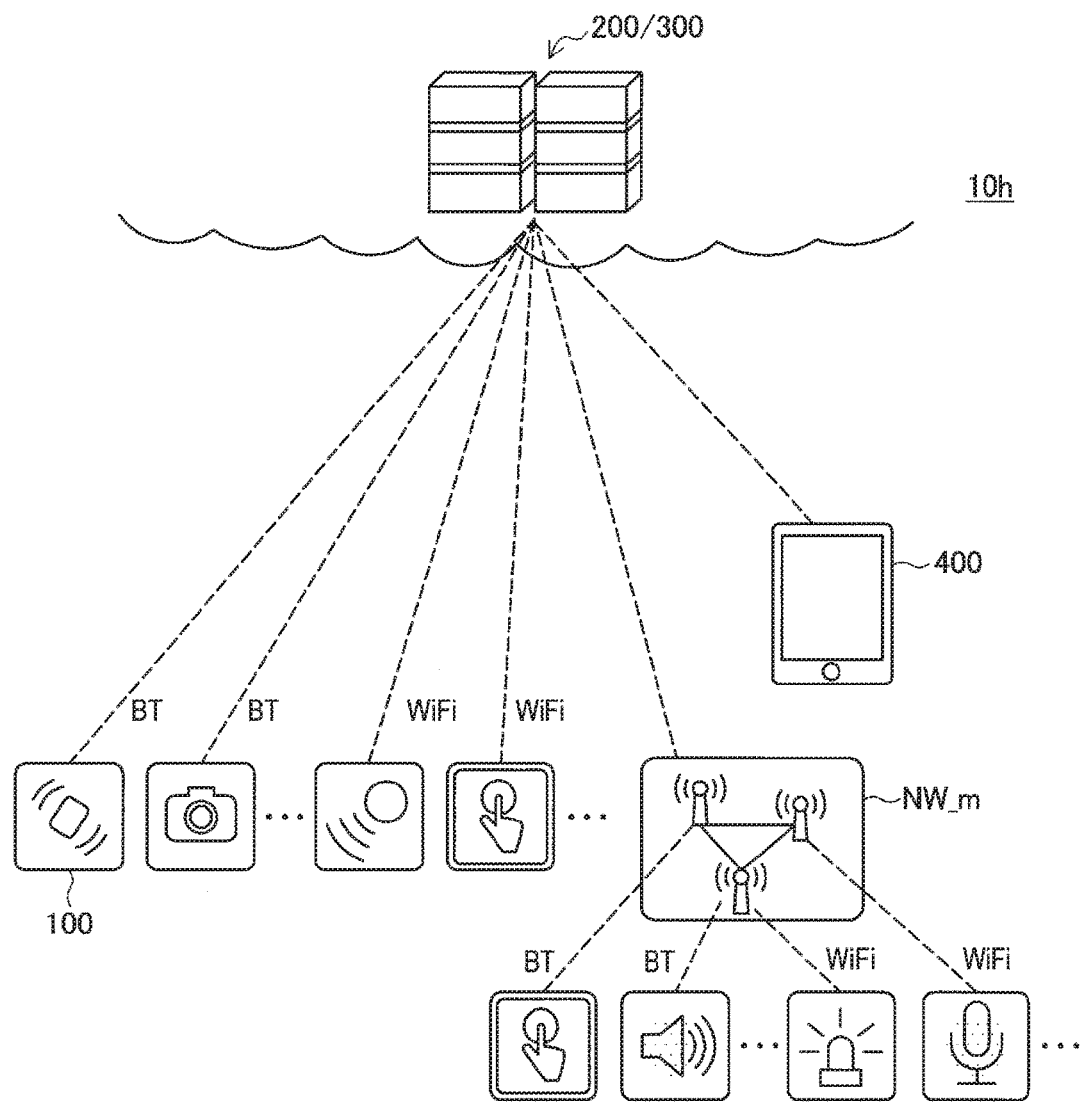

[Fig. 10]
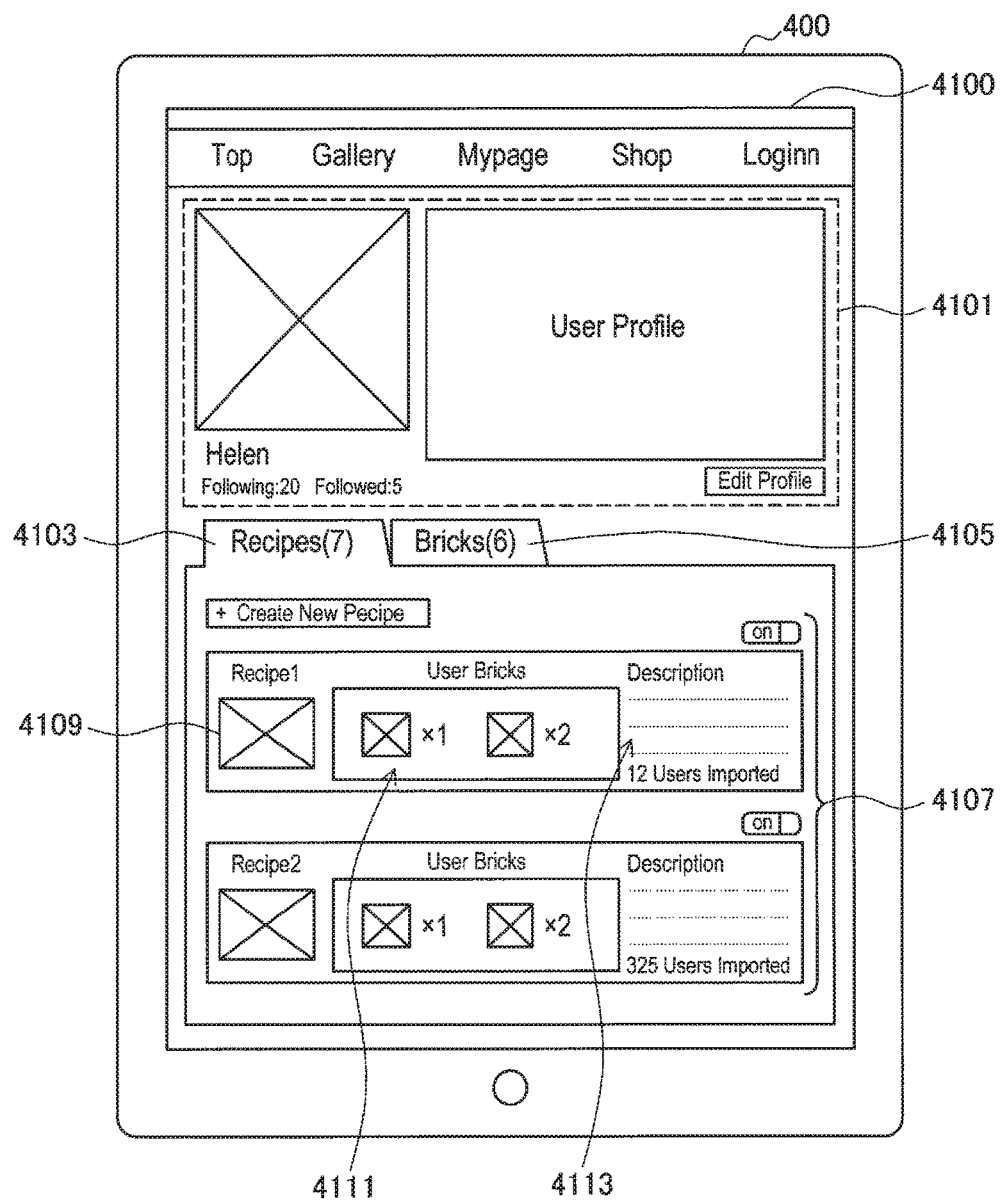

[Fig. 11]
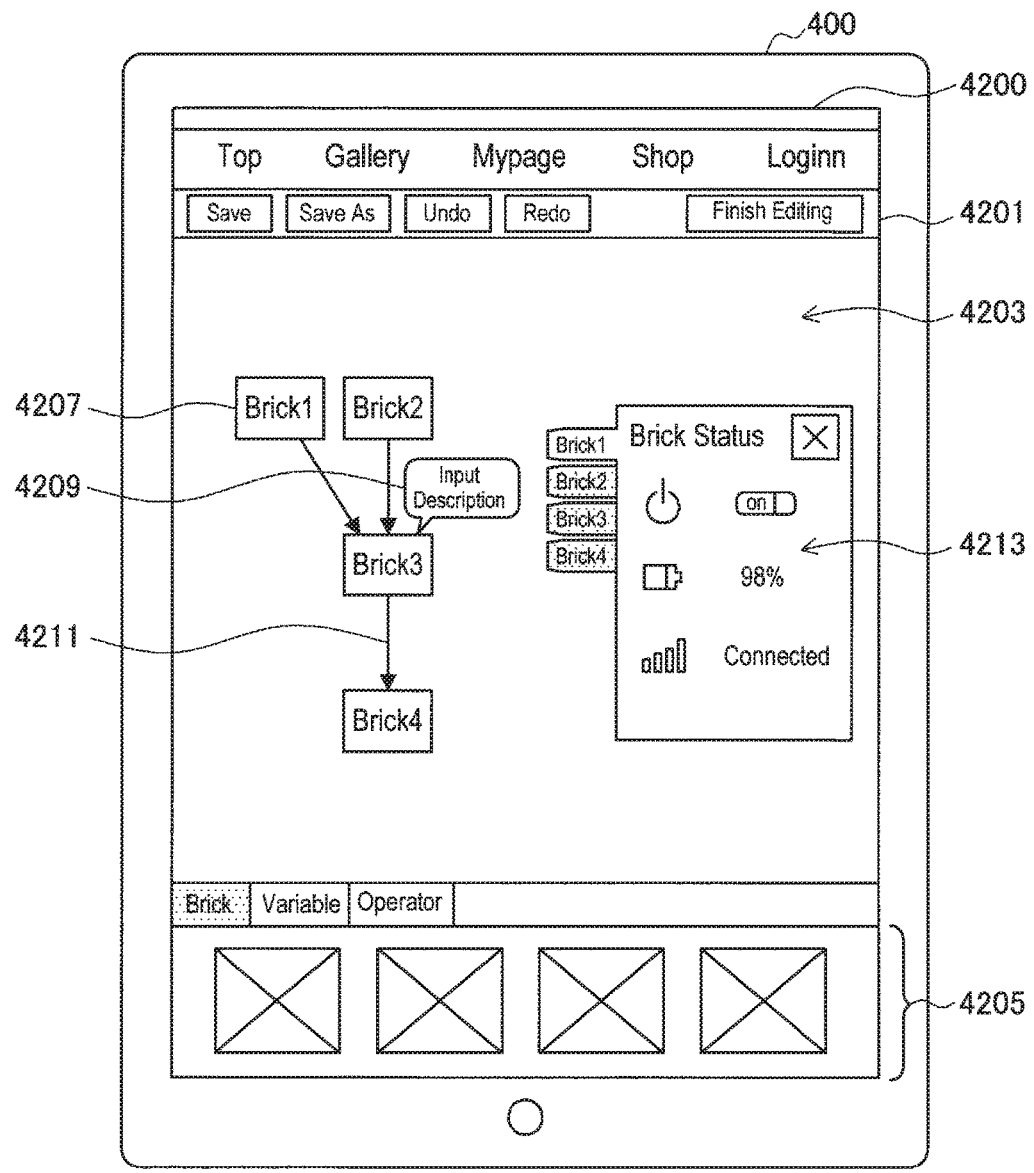

[Fig. 12]
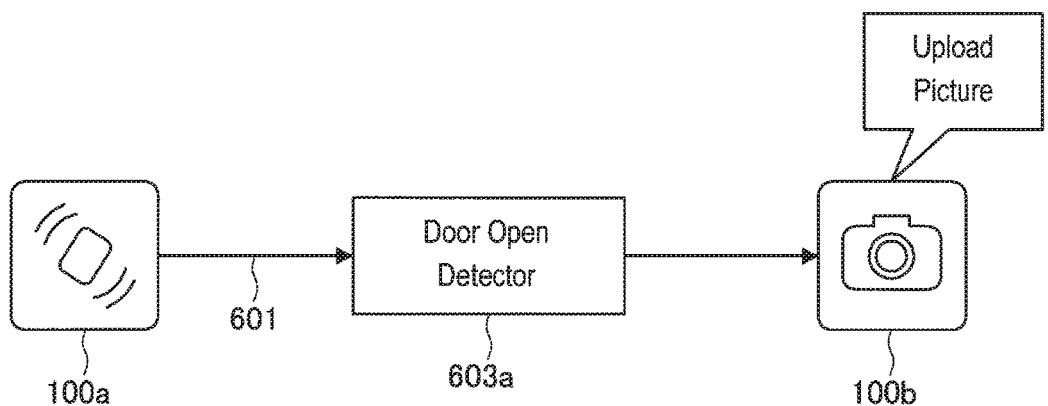
[Fig. 13]
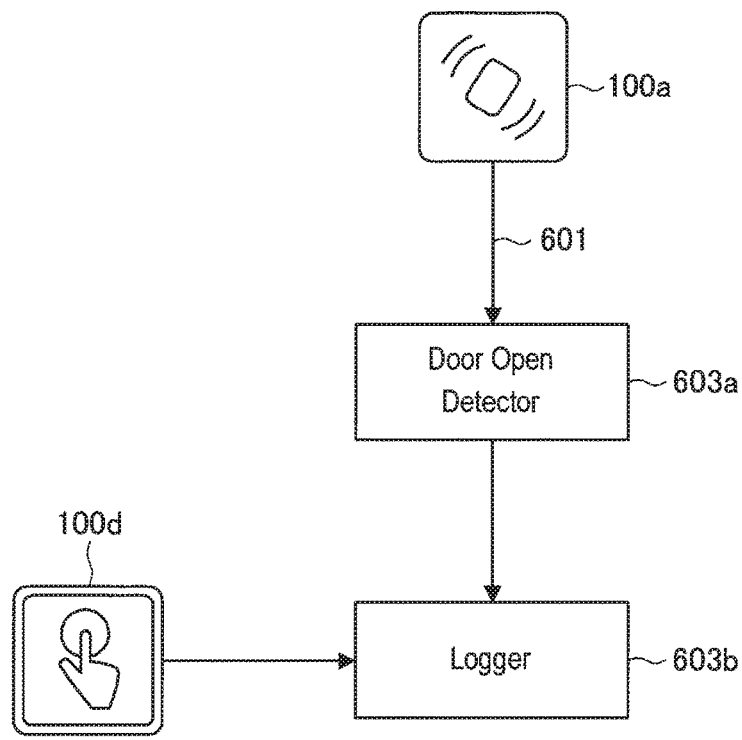

[Fig. 14]
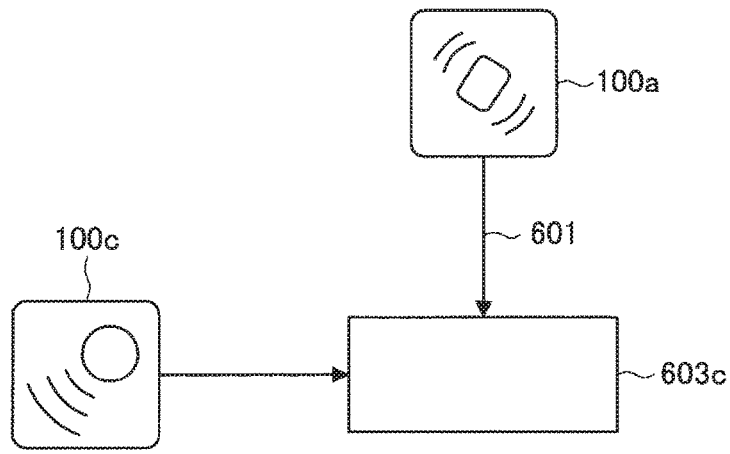
[Fig. 15]
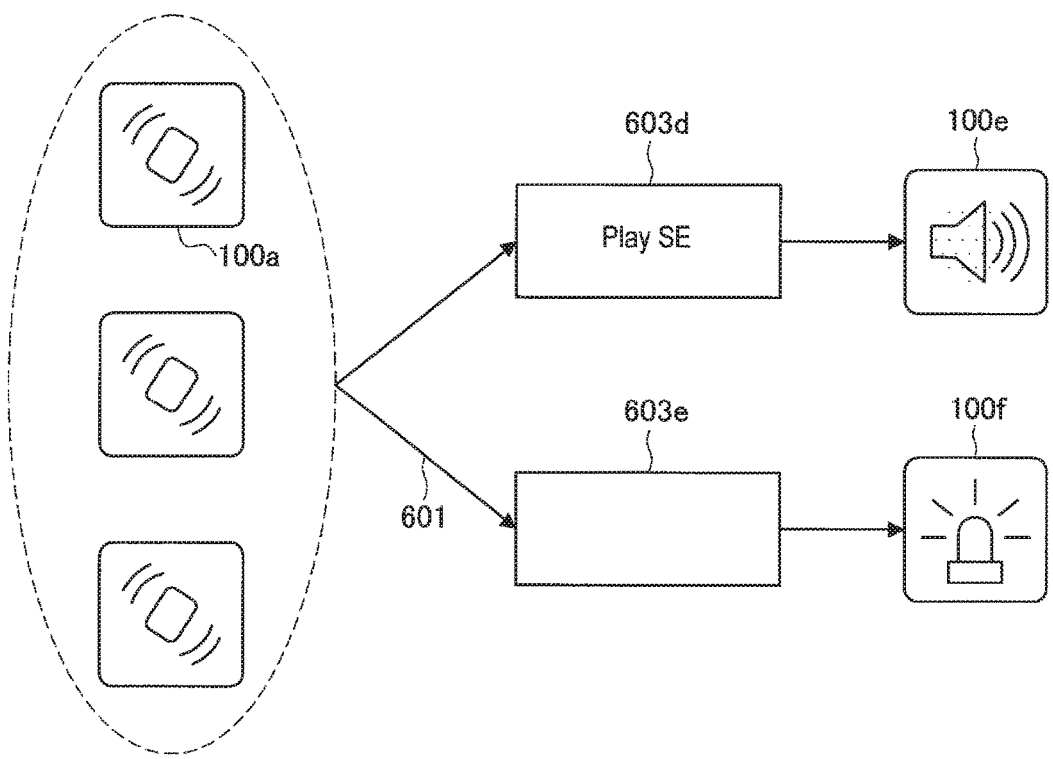

[Fig. 16]
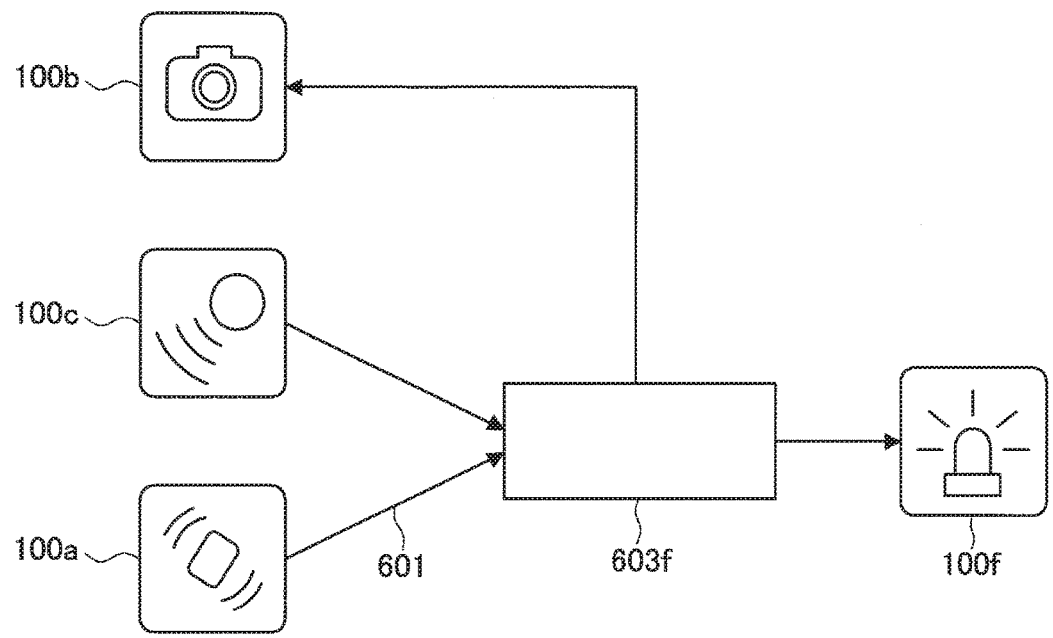
[Fig. 17]
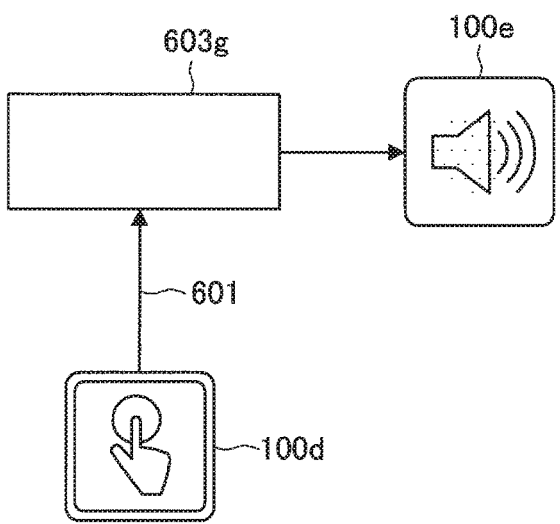

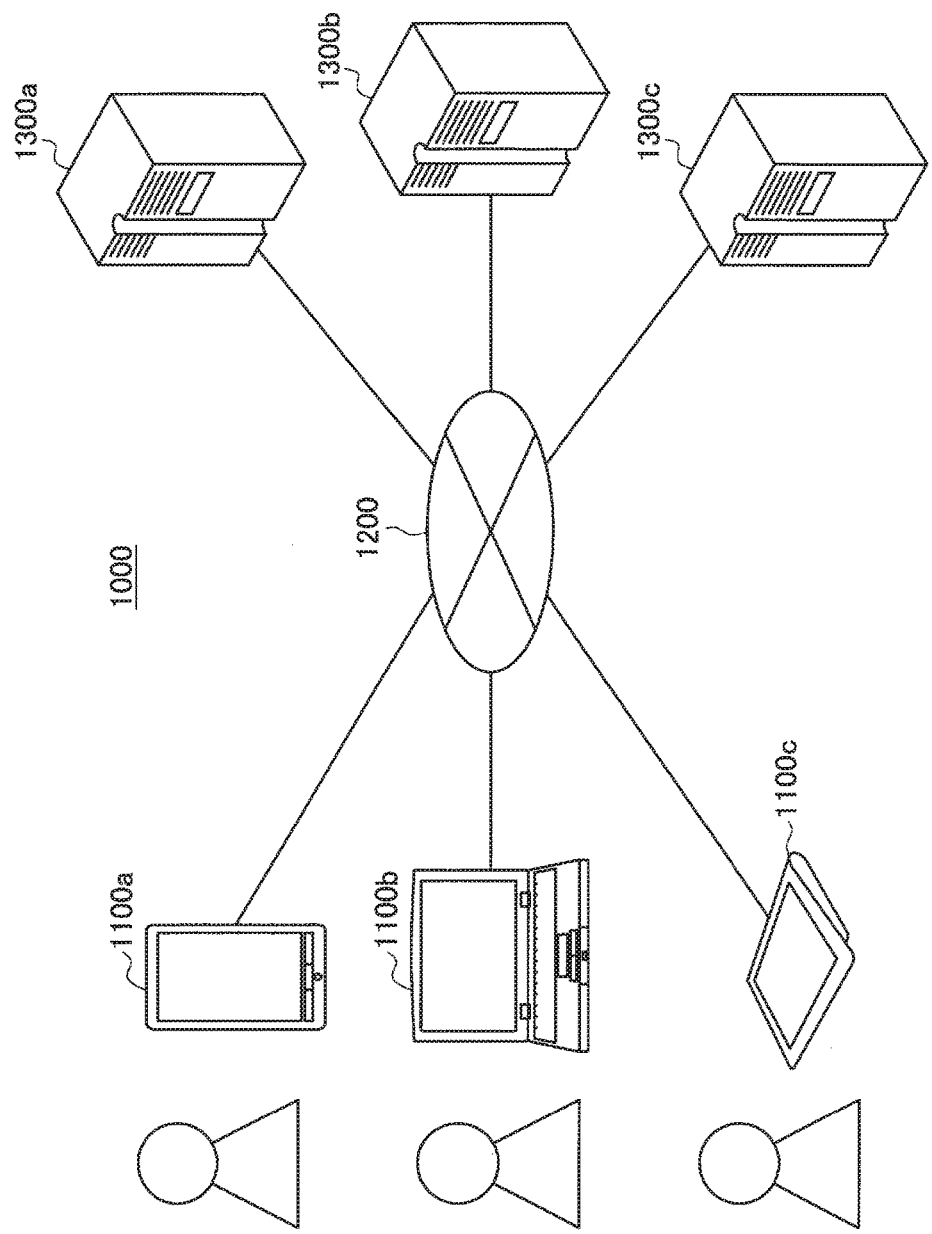
[Fig. 18]

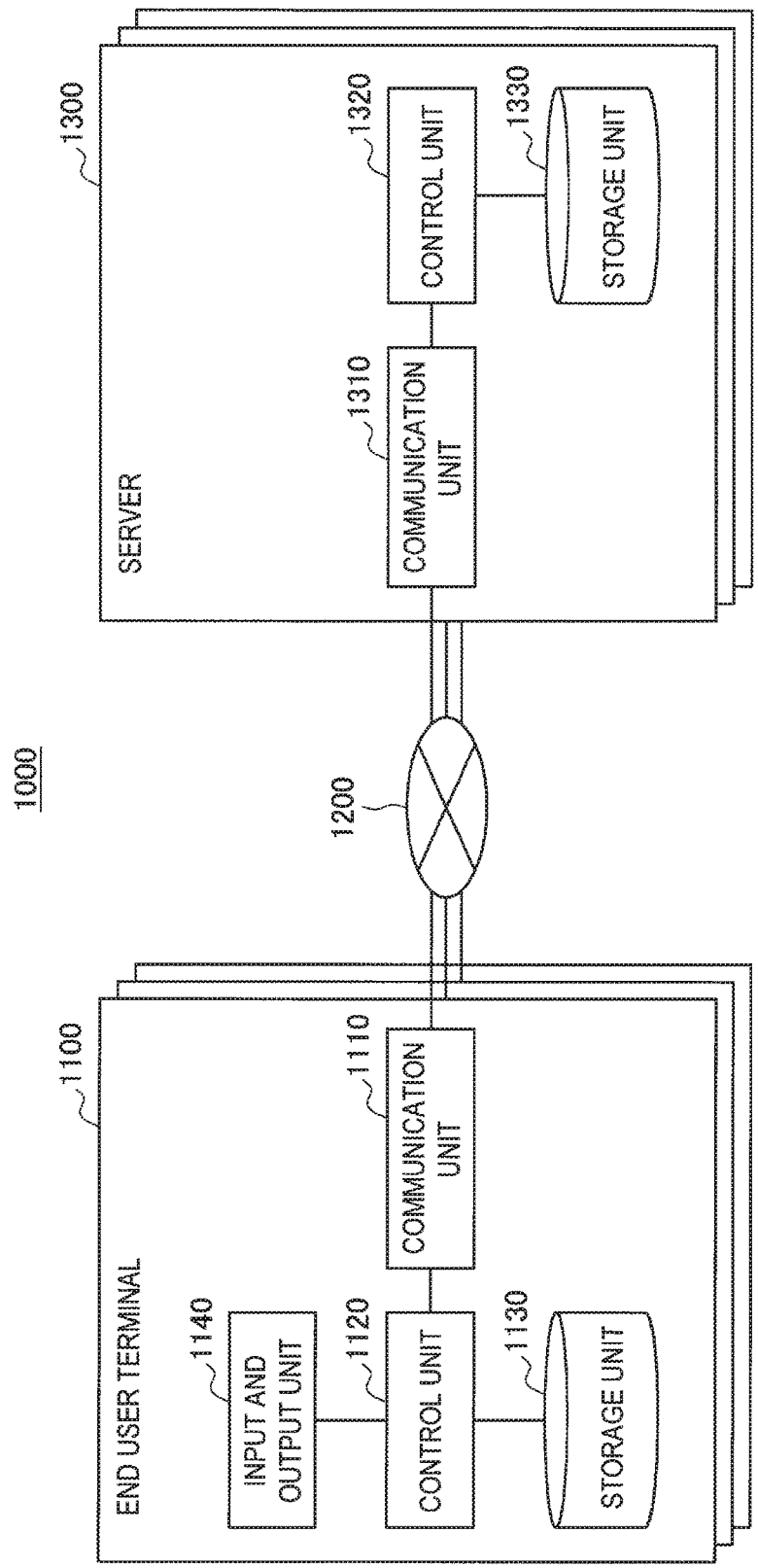

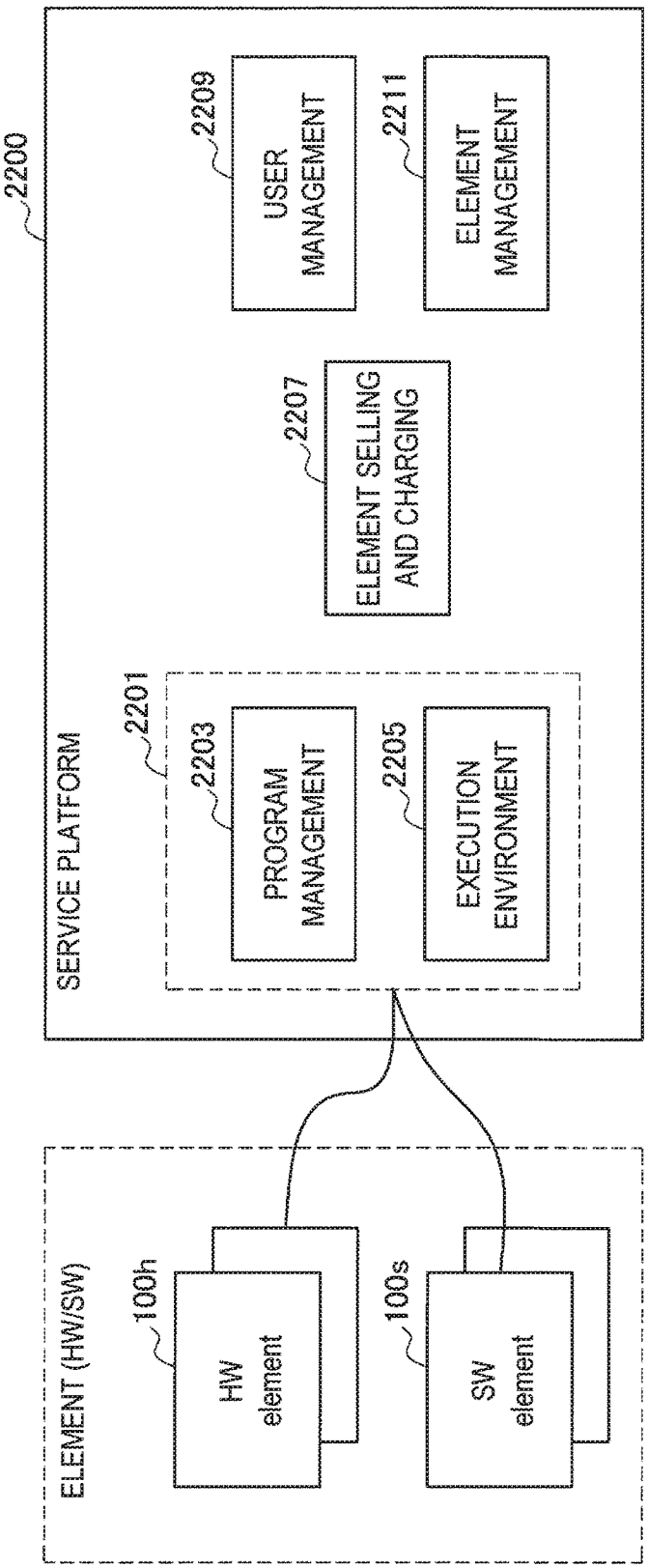
[Fig. 20]

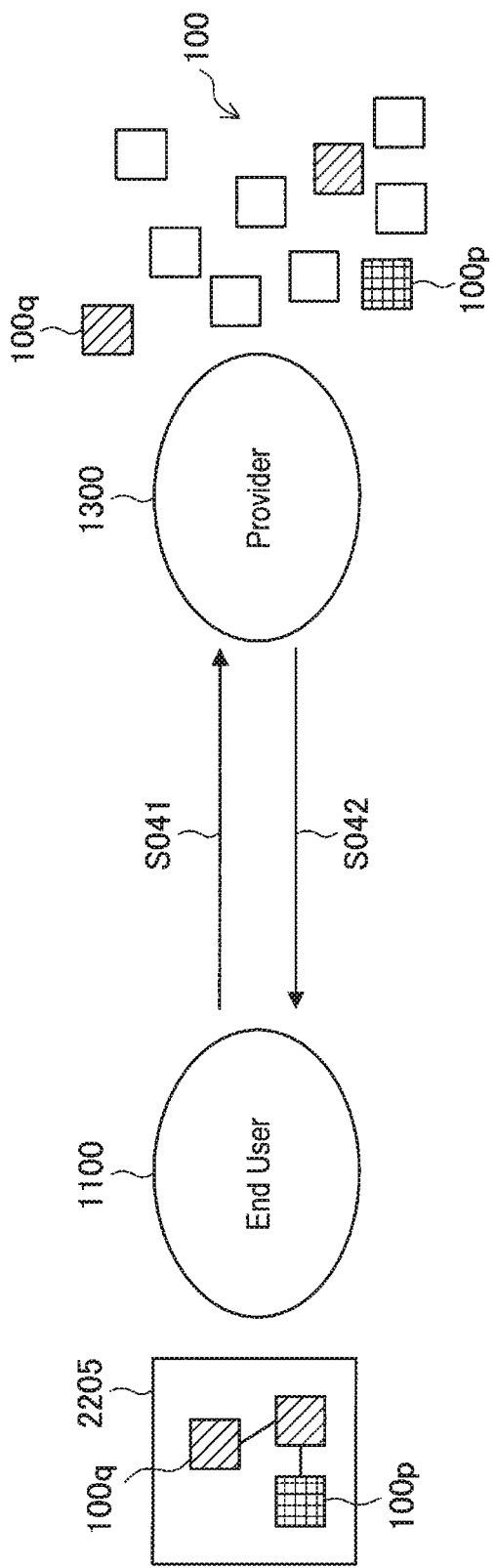
[Fig. 21]

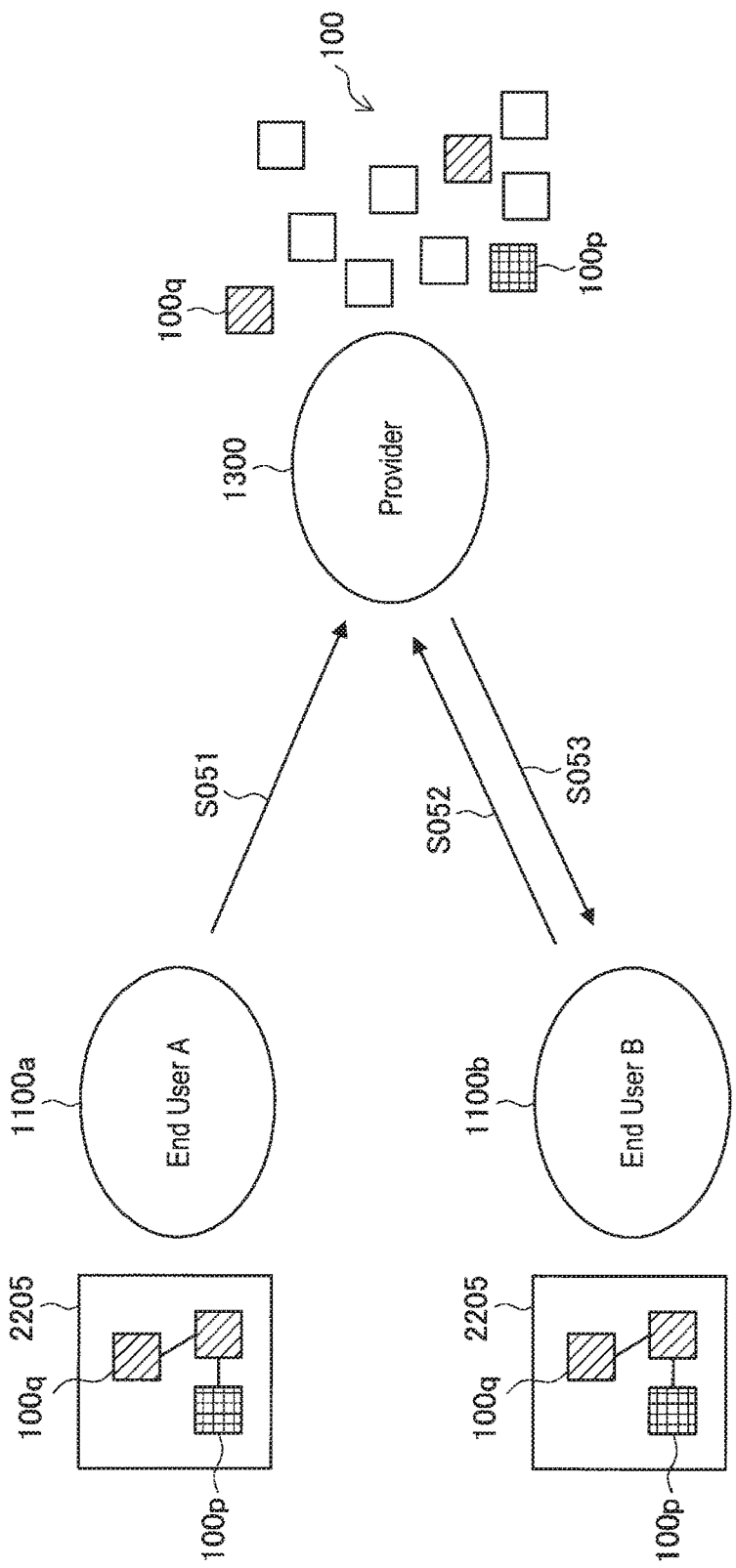

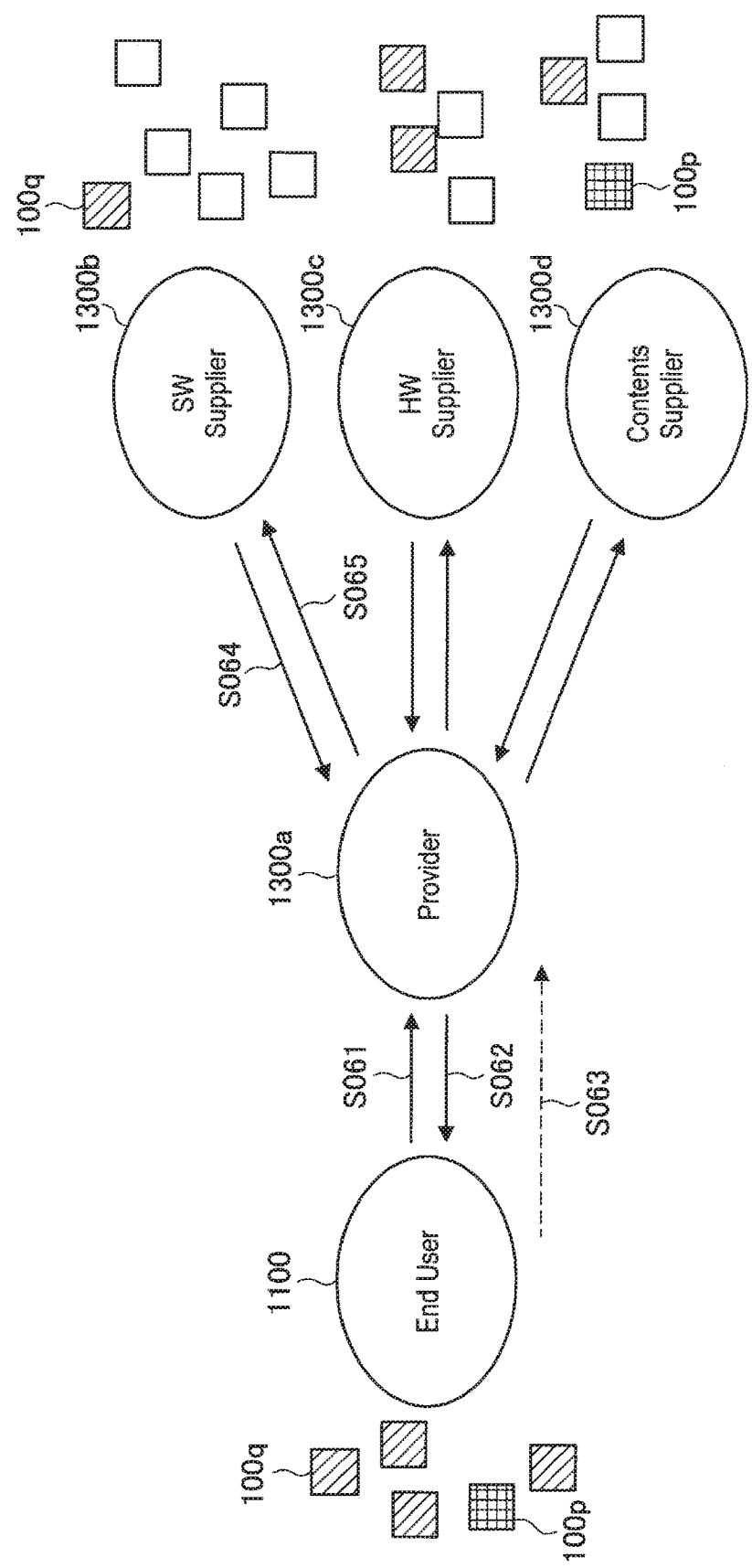

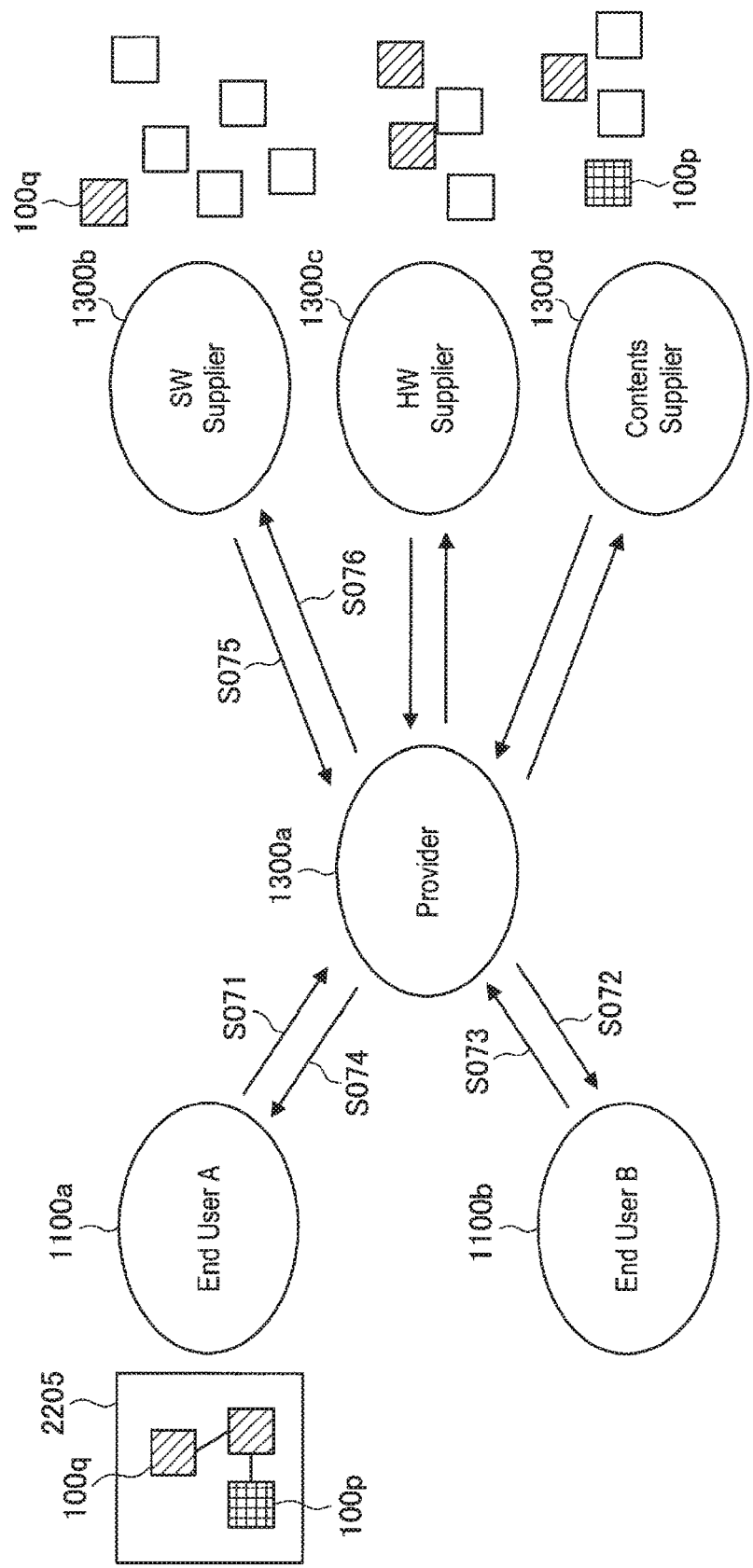
[Fig. 24]

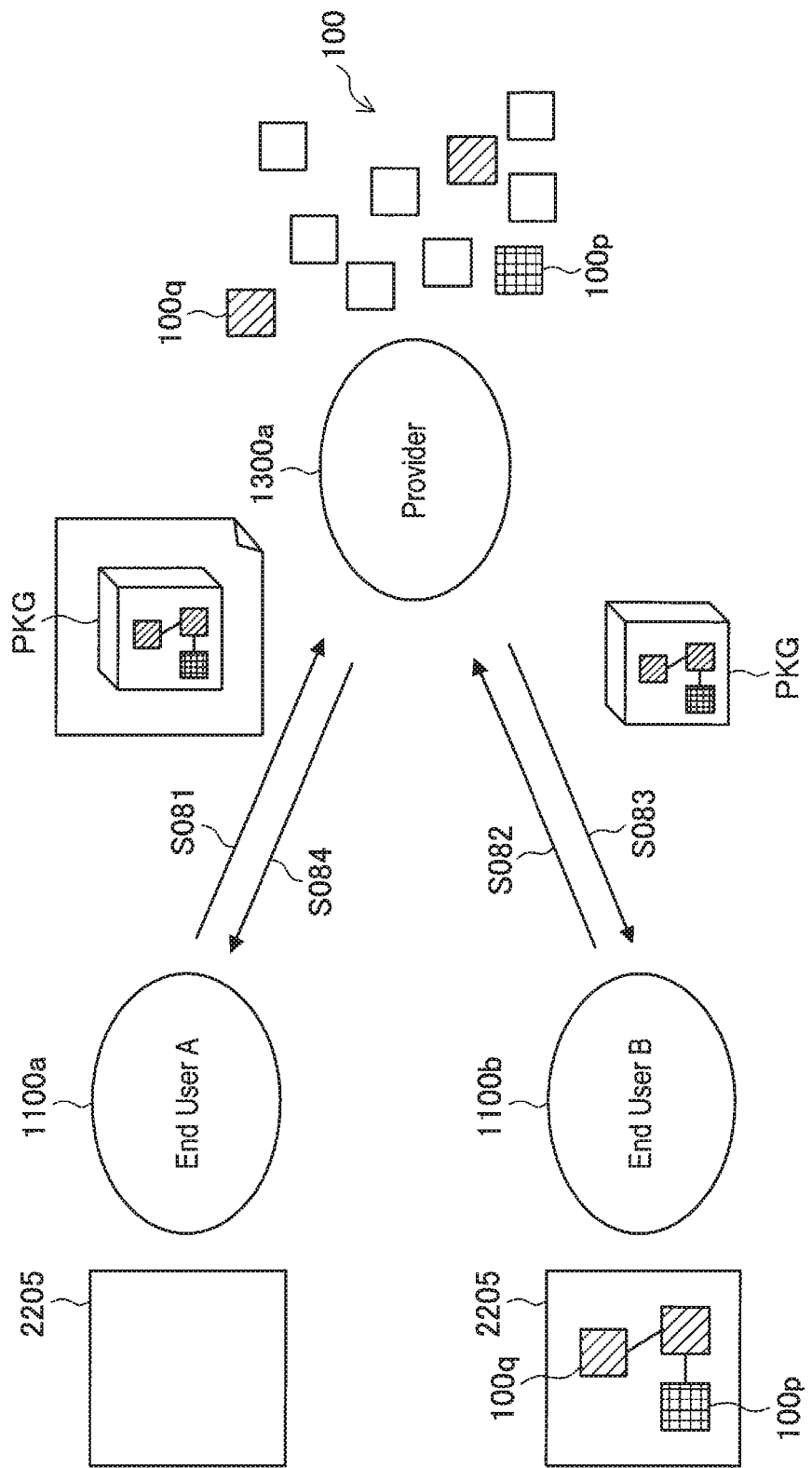
[Fig. 25]

[Fig. 26]
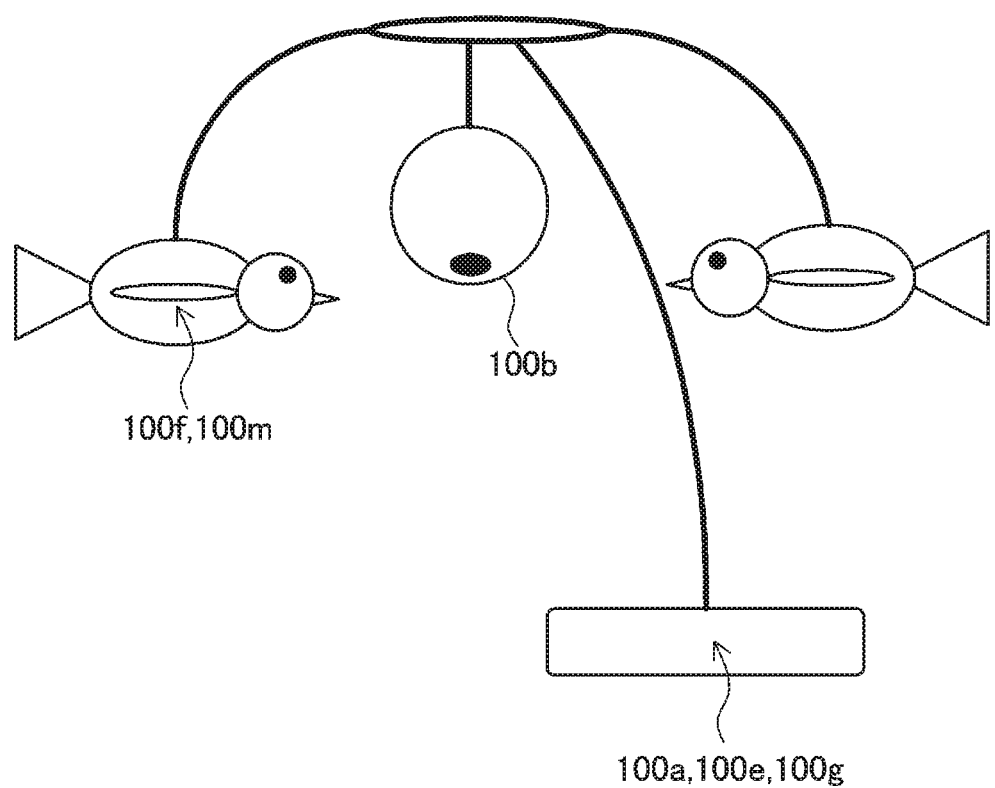

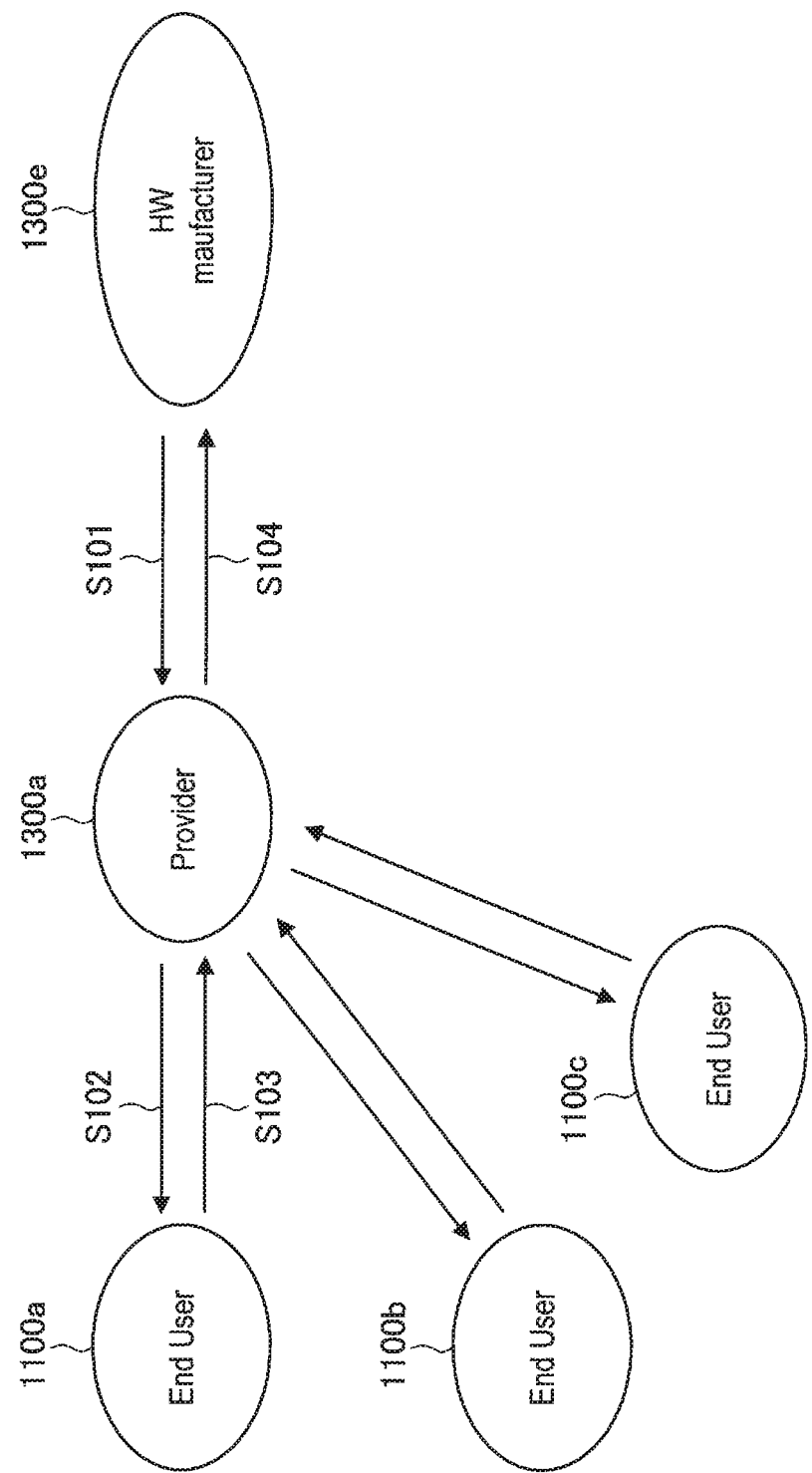
[Fig. 27]

[Fig. 28A]
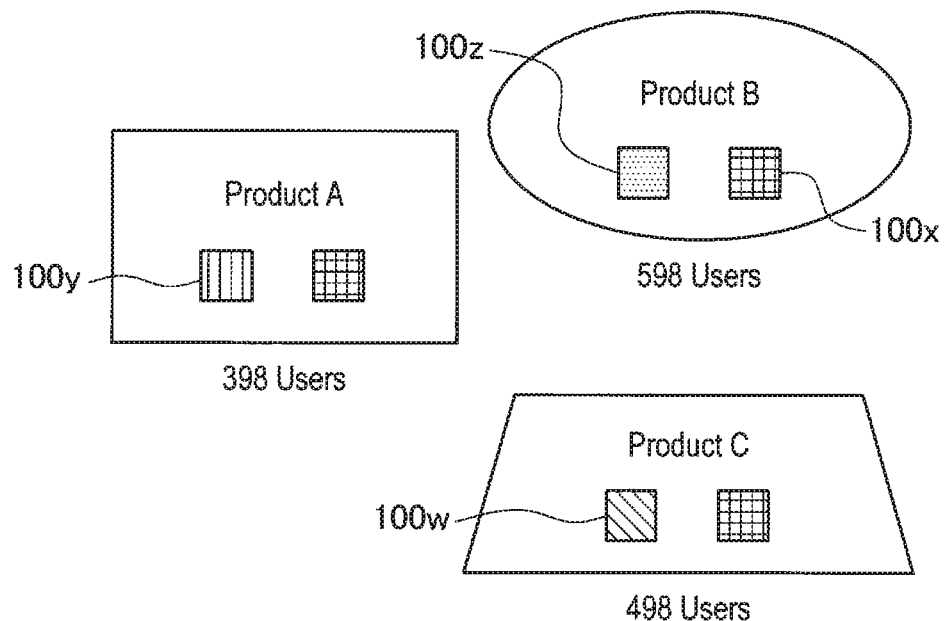
[Fig. 28B]
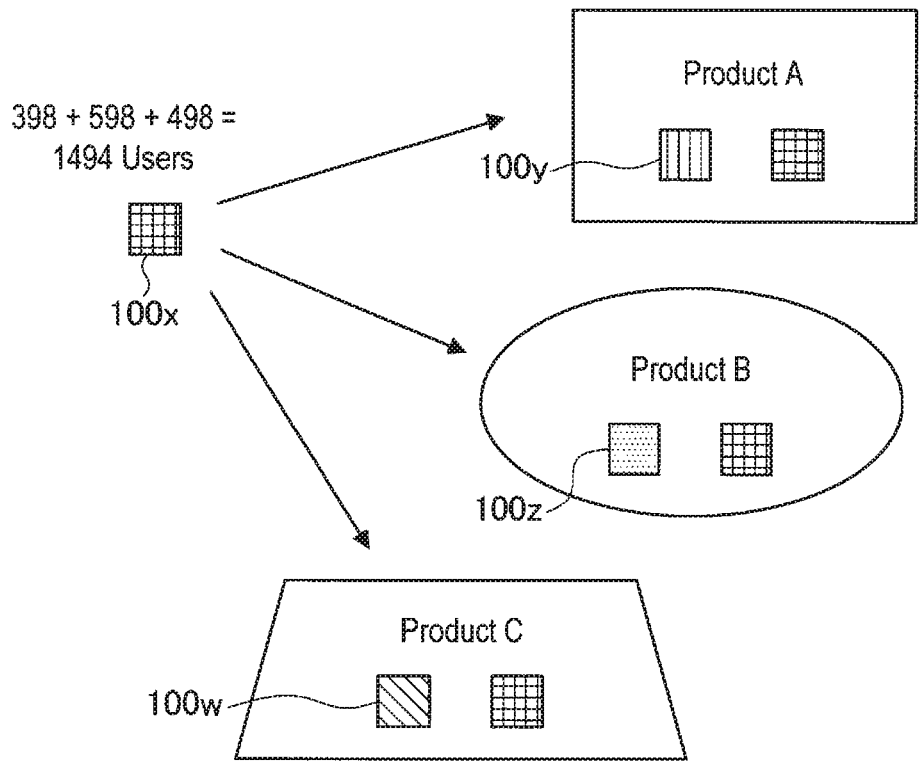

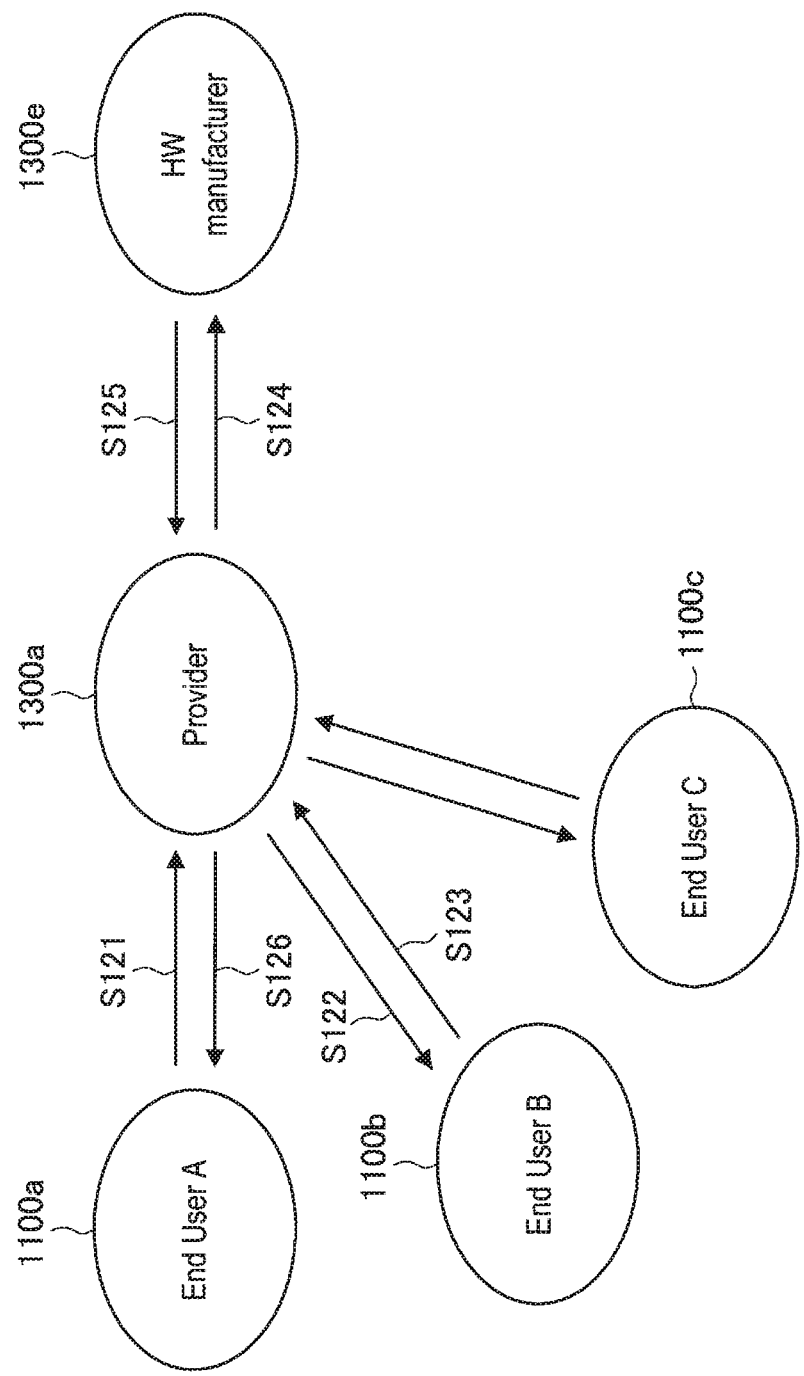

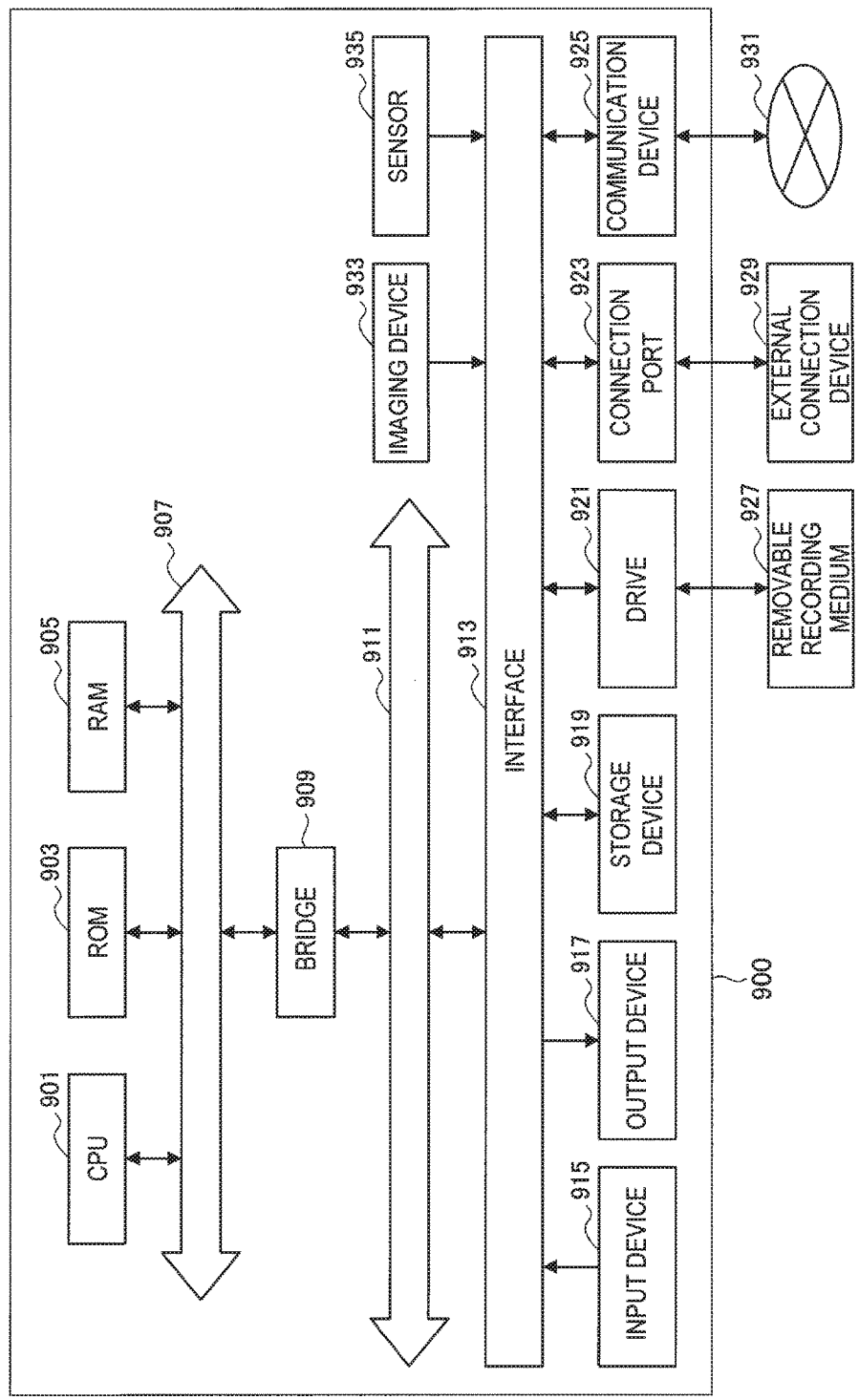
[Fig. 30]

METHOD AND SYSTEM FOR REALIZING FUNCTION BY CAUSING ELEMENTS OF HARDWARE TO PERFORM LINKAGE OPERATION

CROSS REFERENCE TO RELATED APPLICATIONS

This application is a continuation of U.S. application Ser. No. 16/008,770 filed Jun. 14, 2018, which is a continuation of Ser. No. 15/123,171, filed Sep. 1, 2016, which is based on PCT Application No. PCT/JP2015/002360, filed May 8, 2015, which claims the benefit of Japanese Priority Patent Application JP 2014-101507 filed May 15, 2014, the entire contents of which are incorporated herein by reference.

TECHNICAL FIELD

The present disclosure relates to a method and system for realizing a function by causing elements of hardware or software to perform a linkage operation.

BACKGROUND ART

In recent years, with the development of information society, it is becoming possible to reflect various demands from users in product development of hardware and software. For example, PTL 1 proposes a technology for enabling an investor to appropriately invest in development of an application program and enabling a developer to appropriately carry out the development. In this technology, the development of an application program can be carried out according to an intention of the investor by scoring the intention of the investor for the investment.

CITATION LIST

Patent Literature

[PTL 1]
JP 2013-92997A

SUMMARY

Technical Problem

Even in the technology disclosed in PTL 1, however, various demands from users may not be said to be sufficiently reflected in products. Since products such as application programs provide one complete function, consumers are limited to users to whom the function is necessary. Accordingly, products can be difficult to market unless there is some extent of generality of functions. PTL 1 discloses an example of software, but the same applies to hardware.

It is desirable to provide a novel and improved method and system for realizing a function by causing hardware or software to perform a linkage operation to respond to various demands from users.

Solution to Problem

According to a first exemplary embodiment, the disclosure is directed to a system that stores functional information indicating a capability of each of a plurality of elements located remotely from the system; identifies a function capable of being performed by linking a plurality of the elements based on the stored functional information; and transmits information corresponding to the identified function capable of being performed by linking the plurality of elements to a first device remote from the system.

According to a first exemplary embodiment, the disclosure is directed to a method performed by an information processing system, the method comprising: identifying a function capable of being performed by linking a plurality of elements located remotely from the information processing system based on stored functional information indicating a capability of each of the plurality of elements; and transmitting information corresponding to the identified function capable of being performed by linking the plurality of elements to a first device remote from the information processing system. According to another exemplary embodiment, the disclosure is directed to a computer readable medium including computer program instructions, which when executed by an information processing system, cause the information processing system to perform the method discussed above.

Advantageous Effects of Invention

According to an embodiment of the present disclosure described above, it is possible to realize a function by causing hardware or software to perform a linkage operation to respond to various demands from users.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram illustrating an overall configuration of a system to which a technology according to an embodiment of the present disclosure can be applied.

FIG. 2 is a diagram illustrating a first specific configuration example of the system illustrated in FIG. 1.

FIG. 3 is a diagram illustrating a second specific configuration example of the system illustrated in FIG. 1.

FIG. 4 is a diagram illustrating a third specific configuration example of the system illustrated in FIG. 1.

FIG. 5 is a diagram illustrating a fourth specific configuration example of the system illustrated in FIG. 1.

FIG. 6 is a diagram illustrating a fifth specific configuration example of the system illustrated in FIG. 1.

FIG. 7 is a diagram illustrating a sixth specific configuration example of the system illustrated in FIG. 1.

FIG. 8 is a diagram illustrating a seventh specific configuration example of the system illustrated in FIG. 1.

FIG. 9 is a diagram illustrating an eighth specific configuration example of the system illustrated in FIG. 1.

FIG. 10 is a diagram illustrating a first example of a UI supplied in the system illustrated in FIG. 1.

FIG. 11 is a diagram illustrating a second example of a UI supplied in the system illustrated in FIG. 1.

FIG. 12 is an explanatory diagram illustrating a first specific example of a linkage operation of elements in the system illustrated in FIG. 1.

FIG. 13 is an explanatory diagram illustrating a second specific example of a linkage operation of elements in the system illustrated in FIG. 1.

FIG. 14 is an explanatory diagram illustrating a third specific example of a linkage operation of elements in the system illustrated in FIG. 1.

FIG. 15 is an explanatory diagram illustrating a fourth specific example of a linkage operation of elements in the system illustrated in FIG. 1.

FIG. 16 is an explanatory diagram illustrating a fifth specific example of a linkage operation of elements in the system illustrated in FIG. 1.

FIG. 17 is an explanatory diagram illustrating a sixth specific example of a linkage operation of elements in the system illustrated in FIG. 1.

FIG. 18 is a diagram illustrating a configuration example of a system according to an embodiment of the present disclosure.

FIG. 19 is a diagram illustrating a functional configuration example of a system according to an embodiment of the present disclosure.

FIG. 20 is a diagram illustrating a configuration example of a service platform according to an embodiment of the present disclosure.

FIG. 21 is a diagram illustrating a first example of exchange of information regarding elements according to an embodiment of the present disclosure.

FIG. 22 is a diagram illustrating a second example of exchange of information regarding elements according to an embodiment of the present disclosure.

FIG. 23 is a diagram illustrating a third example of exchange of information regarding elements according to an embodiment of the present disclosure.

FIG. 24 is a diagram illustrating a fourth example of exchange of information regarding elements according to an embodiment of the present disclosure.

FIG. 25 is a diagram illustrating a fifth example of exchange of information regarding elements according to an embodiment of the present disclosure.

FIG. 26 is an explanatory diagram illustrating an example of a package which is sold in the example of FIG. 25.

FIG. 27 is a diagram illustrating a sixth example of exchange of information regarding elements according to an embodiment of the present disclosure.

FIG. 28A is an explanatory diagram illustrating how a structure such as that of the example of FIG. 27 is superior.

FIG. 28B is an explanatory diagram illustrating how a structure such as that of the example of FIG. 27 is superior.

FIG. 29 is a diagram illustrating a seventh example of exchange of information regarding elements according to an embodiment of the present disclosure.

FIG. 30 is a block diagram illustrating a hardware configuration example of an information processing apparatus according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Example of applicable system
1-1. Overall configuration
1-2. Specific configuration examples
1-3. Examples of user interface
1-4. Examples of linkage operations
2. Embodiments of the present disclosure
2-1. System configuration example
2-2. Configuration of service platform
2-3. Examples of exchange of information regarding element
2-4. Conclusion of embodiment
3. Hardware configuration
4. Supplement 1. Example of Applicable System 1-1. Overall Configuration FIG. 1 is a diagram illustrating an overall configuration of a system to which a technology according to an embodiment of the present disclosure can be applied. Referring to FIG. 1, a system 10 includes an element 100, a manager 200, a server 300, and a user interface (UI) device 400. These devices are mutually connected via a network NW. The network NW includes, for example, Bluetooth (registered trademark), Wi-Fi, and the Internet. The system 10 will be described below as an example, but the technology according to the embodiment of the present disclosure can also be applied to various other systems.

The element 100 is a device that includes a communication unit 110, a control unit 120, a function unit 130, and a power unit 140. The communication unit 110 includes a communication device that communicates with the manager 200 and/or another element 100 via the network NW. The control unit 120 is realized by, for example, a micro-controller or a central processing unit (CPU) and controls the function unit 130. The function unit 130 includes, for example, a sensor or an actuator and realizes a unique function of each element 100. The power unit 140 includes a battery or a power plug and supplies power to operate the communication unit 110, the control unit 120, and the function unit 130, A power unit is included in not only the element 100 but also the other devices, but is not illustrated.

The manager 200 is a device that includes a communication unit 210, a control unit 220, and a storage unit 230. The communication unit 210 can include a communication device that communicates with the element 100, the server 300, and the UI device 400 via the network NW. The control unit 220 is realized by, for example, a micro-controller or a CPU and controls communication between the elements 100 and between the element 100 and the server 300 via the communication unit 210. The control unit 220 can include a calculation unit 221. The calculation unit 221 performs calculation on information received from the element 100, information transmitted to the element 100, information transmitted to the server 300, information received from the server 300, and the like. The storage unit 230 includes a memory or storage and stores information exchanged through the communication controlled by the control unit 220, information calculated by the calculation unit 221, and the like.

The server 300 includes a communication unit 310, a control unit 320, and a storage unit 330. The communication unit 310 includes a communication device that communicates with the manager 200 via the network NW. The control unit 320 is realized by, for example, a micro-controller or a CPU and can include a calculation unit 321 and a UI supply unit 323. The calculation unit 321 performs calculation on information received from the element 100 or the manager 200, information transmitted to the element 100 or the manager 200, information received from another server, information transmitted to another server, and the like. The UI supply unit 323 supplies a UI so that a user can designate a combination of the element 100 and/or the manager 200 and confirm various kinds of information. For example, the UI is supplied via a display, a touch panel, or the like included in an input and output unit 430 of the UI device 400. The storage unit 330 includes a memory or a storage and stores various kinds of information regarding the element 100, a program causing the plurality of elements 100 to operate in combination, software which can be combined with the element 100, information calculated by the calculation unit 321, and the like.

Here, the storage unit 330 of the server 300 stores, for example, identification information (ID) of the element 100 in the system 10. The element 100 can be added to the system 10 at any time. The storage unit 330 also stores a program causing the plurality of elements 100 to operate in combination. A program can be added at any time by, for example, a user, a developer, or a system administrator. The storage unit 330 stores software. For example, when the software is executed in combination with the element 100, a function is realized. Alternatively, a function may also be realized by executing software in combination. Examples of the functions by which software is realized can include a supply of materials such as audio or an image, a timer, a calendar, an analysis function for image recognition, audio recognition, and the like, and an information acquisition function from an external service such as a weather forecast or news. Software can be added at any time by, for example, a user, a developer, or a system administrator.

On the other hand, for example, the UI supply unit 323 of the server 300 supplies a UI via the display, the touch panel, or the like included in the input and output unit 430 of the UI device 400. For example, the user can select a program causing the plurality of elements 100 to operate in combination via the UI from programs preinstalled in the elements 100 or the manager 200 and programs supplied by the server 300. The user can also designate a combination of the plurality of elements 100, a combination of the element 100 and software, or a combination of a plurality of types of software via the UI. When the designated combination is stored as a program in the storage unit 330 of the server 300 and the program is executed by the element 100 and the software, the user can obtain a desired application.

The UI device 400 is a device that includes a communication unit 410, a control unit 420, and the input and output unit 430. The communication unit 410 can include a communication device that communicates with the manager 200 and the server 300 via the network NW. The control unit 420 is realized by, for example, a micro-controller or a CPU to control the input and output unit 430 and control exchange of information via the communication unit 410. The input and output unit 430 includes, for example, a display, a speaker, and a touch panel, suggests various kinds of information to the user via the UI, and receives a manipulation input from the user.

1-2. Specific Configuration Examples

First Example

FIG. 2 is a diagram illustrating a first specific configuration example of the system illustrated in FIG. 1. Referring to FIG. 2, a system 10a includes a first tablet functioning as an element 100, a second tablet functioning as the element 100, a manager 200, and a UI device 400, and a server 300.

Both of the first and second tablets similarly include a display, a touch panel, a CPU, and a sensor. In the system 10a, one of the two tablets functions as the element 100, the manager 200, and the UI device 400 and the other tablet functions as the element 100. The roles of these tablets may be compatible and tablets functioning as the manager 200 and the UI device 400 may switch according to a circumstance. In the system 10a, for example, a function desired by the user can be realized by using various sensors of the tablets and operating the two tablets in combination.

In the example illustrated in FIG. 2, the first and second tablets are examples of terminal devices including the function unit 130 (a sensor or the like) functioning as the element 100 and the control unit 220 (a CPU or the like) functioning as the manager 200. The terminal devices are not limited to the tablets, but may be other devices such as smartphones. The number of terminal devices included in the system 10a is not limited to the number in the illustrated example. For example, three or more terminal devices may be used.

Second Example

FIG. 3 is a diagram illustrating a second specific configuration example of the system illustrated in FIG. 1. Referring to FIG. 3, a system 10b includes elements 100a to 100g, a tablet functioning as a manager 200 and a UI device 400, and a server 300.

The system 10b, the tablet functions as the manager 200 and the UI device 400. As in the foregoing first example, the tablet may be replaced with another device such as a smartphone. In the illustrated example, the elements 100 include an acceleration sensor 100a, a camera 100b, a human detection sensor 100c, a button 100d, a speaker 100e, a light-emitting diode (LED) lamp 100f, and a microphone 100g. Each of the elements 100 communicates with the tablet through wireless communication such as Bluetooth (registered trademark) and performs a linkage operation under the control of the manager 200 realized by the tablet.

In the following examples, some or all of the acceleration sensor 100a to the microphone 1002 are illustrated as examples of the elements 100, but kinds of the elements 100 are not intended to be limited to those used in any of the examples. In each of the examples, the system 10 can include any of the acceleration sensor 100a to the microphone 100g or any other kinds of elements 100.

Third Example

FIG. 4 is a diagram illustrating a third specific configuration example of the system illustrated in FIG. 1. Referring to FIG. 4, a system 10c includes elements 100, a manager 200, a tablet functioning as a UI device 400, and a server 300.

In the system 10c, the manager 200 is present independently from the tablet functioning as the UI device 400. For example, the manager 200 may be realized by a dedicated device or may be realized as one of the functions of a base station of Wi-Fi or the like. As in the foregoing first and second examples, the tablet functioning as the UI device 400 may be replaced with another device such as a smartphone. The manager 200 and the tablet can independently communicate with the server 300. When settings of the system 10c are changed through a UI supplied by the tablet, the tablet may transmit setting information directly to the manager 200 via Wi-Fi or the like.

In the example of FIG. 4, not only Bluetooth (registered trademark) but also Wi-Fi is used for the communication between the manager 200 and the elements 100. A mesh network repeater NW_m by Wi-Fi or the like is used for connection to the elements 100 located at remote places. An embodiment of the present disclosure is not limited to the illustrated third example. In other examples, various types of wireless communication such as Bluetooth (registered trademark) or Wi-Fi can also be used for communication between the elements 100 and the manager 200 and/or between the elements 100.

Fourth Example

FIG. 5 is a diagram illustrating a fourth specific configuration example of the system illustrated in FIG. 1. Referring to FIG. 5, a system 10d includes elements 100 of which some also function as a manager 200, a tablet functioning as a UI device 400, and a server 300.

Unlike the foregoing first to third examples, at least one of the elements 100 functions as the manager 200 in the system 10d. In the system 10d, the elements 100 mutually form a mesh network through Bluetooth (registered trademark). In such a configuration, even when communication with the server 300 and the UI device 400 (tablet) is temporarily disconnected in the system 10d, the elements 100 can autonomously perform a linkage operation.

Fifth Example

FIG. 6 is a diagram illustrating a fifth specific configuration example of the system illustrated in FIG. 1. Referring to FIG. 6, a system 10e includes elements 100 of which some function as a manager 200, a tablet functioning as a UI device 400, and a server 300. The system 10e is an example in which the manager 200 is incorporated into any of the elements 100 in the system 10c in the foregoing third example.

Sixth Example

FIG. 7 is a diagram illustrating a sixth specific configuration example of the system illustrated in FIG. 1. Referring to FIG. 7, a system 10f includes elements 100, managers 200a and 200b, a tablet functioning as a UI device 400, and a server 300. The system 10f is an example in which the plurality of managers 200 are disposed in the system 10c in the foregoing third example. For example, each of the elements 100 can be connected to a manager of which a position is closer between the managers 200a and 200b. A connection state of the elements 100 and a program causing the elements 100 to perform a linkage operation are synchronized as necessary or periodically between the plurality of managers 200a and 200b.

Seventh Example

FIG. 8 is a diagram illustrating a seventh specific configuration example of the system illustrated in FIG. 1. Referring to FIG. 8, a system 10g includes elements 100, a manager 200a, a tablet functioning as a manager 200b and the UI device 400, and a server 300. The system 10g is an example in which the function of the manager 200b is integrated into the tablet in the system 10f in the foregoing sixth example. For example, each of the elements 100 can be connected to a manager of which a position is closer between the manager 200a and the tablet. A connection state of the elements 100 and a program causing the elements 100 to perform a linkage operation are synchronized as necessary or periodically between the manager 200a and the tablet.

Eighth Example

FIG. 9 is a diagram illustrating an eighth specific configuration example of the system illustrated in FIG. 1.

Referring to FIG. 9, a system 10h includes elements 100, a tablet functioning as a UI device 400, and a server 300 functioning as a manager 200. The system 10h is an example in which the functions of the manager 200 are incorporated into the server 300 in the system 10b in the foregoing second example. For example, each of the elements 100 directly communicates with the server 300 via a mobile communication network or the like.

The several specific configuration examples of the system 10 illustrated in FIG. 1 have been described. Specific configuration examples of the system 10 are not limited to the above-described examples, but various modification examples which those skilled in the art will clearly understand based on these configuration examples can be included.

1-3. Examples of User Interface

FIG. 10 is a diagram illustrating a first example of the UI supplied in the system illustrated in FIG. 1. Referring to FIG. 10, a screen 4100 displayed on the display of a terminal device functioning as the UI device 400 includes a user profile 4101, a program list tab 4103, and an element list tab 4105. Since the program list tab 4103 is selected in the illustrated example, a program list 4107 is displayed. The program list 4107 includes program icons 4109, use element icons 4111, and descriptions 4113. For example, the screen 4100 can be displayed as a portal screen when the user uses a service provided by the system 10.

FIG. 11 is a diagram illustrating a second example of the VI supplied in the system illustrated in FIG. 1. Referring to FIG. 11, a screen 4200 displayed on the display of the terminal device functioning as the UI device 400 includes a tool bar 4201, a canvas 4203, and a tray 4205. For example, the screen 4200 is used to edit a program causing the elements 100 in the system 10 to perform a linkage operation. In the tool bar 4201, function buttons such as "save" and "redo" are disposed. In the canvas 4203, element icons 4207, a detailed information icon 4209, and links 4211 can be disposed or drawn. Referring to such icons and links, the elements 100 used for the linkage operation, a process performed by each element 100, and a relation between the elements 100 can be set and confirmed. In the canvas 4203, an element property box 4213 is disposed, for example, to display the properties or states of the elements 100 disposed as the element icons 4207. In the tray 4205, the elements 100, software, or the like which can be embedded into a program by being disposed in the canvas 4203 are displayed as icons.

The UIs described with reference to FIGS. 10 and 11 are merely examples and UIs with various forms can be supplied in the embodiment. For example, on the screen for editing of a program, as described with reference to FIG. 11, various UIs used on screens for visual programming can be applied.

1-4. Examples of Linkage Operations

Hereinafter, specific examples of a linkage operation of the elements in the system illustrated in FIG. 1 will be further described. To facilitate understanding, the description will be made below with reference to a diagram visually expressing a program causing the elements 100 to perform a linkage operation. Such a diagram is not necessarily associated with a UI (for example, a UI exemplified as the screen 4200 in FIG. 11) provided by the UI device 400. Software to be described below may be provided as an element (software element) similar to the element 100 (hardware element) or may be provided as a part of the function or operation of the element 100.

First Specific Example

FIG. 12 is an explanatory diagram illustrating a first specific example of a linkage operation of the elements in the system illustrated in FIG. 1. Referring to FIG. 12, in this example, the acceleration sensor 100*a* and the camera 100*b* are used among the elements 100. For example, the acceleration sensor 100*a* is mounted on a door of a refrigerator and the camera 100*b* is mounted at a position at which the inside of the refrigerator can be imaged. In the illustrated example, a link 601 oriented from the acceleration sensor 100*a* to the camera 100*b* means that "the camera 100*b* performs photographing based on a detected value of the acceleration sensor 100*a*." in the illustrated example, "uploading a captured image to the server" is designated as an operation of the camera 100*b*.

In the illustrated example, software 603*a* detecting that the door is opened based on acceleration is used. The software 603*a* is executed by, for example, the calculation unit 221 of the manager 200 and detects that the door of the refrigerator is opened based on an analysis result of a value detected by the acceleration sensor 100*a*. By introducing the software 603*a*, the link 601 is a process in which "the camera 100*b* performs photographing when it is determined that the door of the refrigerator is opened based on the value detected by the acceleration sensor 100*a*"

Through the setting of such a program, in this example, an image photographed by the camera 100*b* when the door of the refrigerator is opened is uploaded to the server. The user can comprehend a change of the contents or a latest inventory state of the refrigerator by viewing the uploaded image.

Here, when opening of the door of the refrigerator is desired to be detected, a sensor dedicated for opening and closing detection using magnetism can also be used. In this example, however, by introducing the software 603*a*, it is possible to detect that the door is opened using the acceleration sensor 100*a*. Accordingly, in order to detect opening of the door of the refrigerator, for example, the acceleration sensor 100*a* used for another purpose until that time can be appropriated rather than using a dedicated sensor. When it is already unnecessary to detect that the door of the refrigerator is opened, the acceleration sensor 100*a* can be diverted to another purpose. Thus, in the embodiment, by changing a combination with software or other elements 100, the same elements 100 can be utilized for various purposes.

Second Specific Example

FIG. 13 is an explanatory diagram illustrating a second specific example of a linkage operation of the elements in the system illustrated in FIG. 1. Referring to FIG. 13, in this example, the acceleration sensor 100*a* and the button 100*d* are used among the elements 100. For example, the acceleration sensor 100*a* is mounted on the door of a bathroom and the button 100*d* is mounted on a lavatory. In the illustrated example, software 603*a* detecting that the door is opened based on acceleration and software 603*b* recording supplied data are further used. The link 601 oriented from the acceleration sensor 100*a* to the software 603*b* via the software 603*a* means that "the software 603*b* records the fact that it is determined based on a value detected by the acceleration sensor 100*a* that the door is opened," The link 601 oriented from the button 100*d* to the software 603*b* means that the software 603*b* records the fact that a signal is output from the button 100*d*."

In this example, by setting the program in this way, a time at which the user presses the button 100*d* in the lavatory and a time at which the door of the toilet is opened are recorded in a log. For example, when the user decides to press the button 100*d* to wash his or her face in the lavatory after getting up, a time at which the button 100*d* is pressed can be recorded as a time of getting up. For example, changes in the time of getting up every day and the time at which the user goes to the bathroom can be referred to chronologically, and thus such a log is helpful in improving a life rhythm of the user.

Third Specific Example

FIG. 14 is an explanatory diagram illustrating a third specific example of a linkage operation of the elements in the system illustrated in FIG. 1. Referring to FIG. 14, in this example, the acceleration sensor 100*a* and the human detection sensor 100*c* are used among the elements 100. For example, the acceleration sensor 100*a* is mounted on a chair and the human detection sensor 100*c* is mounted on a desk in front of the chair. In the illustrated example, software 603*c* recording a time at which the user sits on the chair based on detection results of the acceleration sensor 100*a* and the human detection sensor 100*c* is further used. The link 601 oriented from the acceleration sensor 100*a* to the software 603*c* means that "a value detected by the acceleration sensor 100*a* is supplied to the software 603*c*." The link 601 oriented from the human detection sensor 100*c* to the software 603*c* means that "a value detected by the human detection sensor 100*c* is supplied to the software 603*c*."

In example, by setting the program in this way, a time at which the user sits on the chair is recorded. The user can comprehend the time at which the he or she sits in his or her workplace based on the record and can take a break when a time for which he or she has continued to sit is too long. Alternatively, software outputting an alert from a smartphone based on the detection result of the software 603*c* may be further embedded. Then, when the user continues to sit for longer than a predetermined time, an alert may be output from the smartphone to urge the user to take a break.

Fourth Specific Example

FIG. 15 is an explanatory diagram illustrating a fourth specific example of a linkage operation of the elements in the system illustrated in FIG. 1. Referring to FIG. 15, in this example, the acceleration sensor 100*a*, the speaker 100*e*, and the LED lamp 100*f* are used among the elements 100. For example, the acceleration sensor 100*a*, the speaker 100*e*, and the LED lamp 100*f* are mounted on appropriate parts of the body of a user (for example, a child). The plurality of acceleration sensors 100*a* may be used. In the illustrated example, software 603*d* reproducing a sound effect according to a pattern of acceleration and software 603*e* flashing a lamp in a predetermined pattern similarly according to a pattern of acceleration are further shown. The pattern of acceleration handled by the software 603 may be a pattern of a single acceleration waveform or may be a combination pattern of a plurality of acceleration waveforms. The link 601 is set to be oriented from the acceleration sensor 100*a* to each of the software 603*d* and the software 603*e*. The link 601 means that "a value detected by the acceleration sensor 100*a* is supplied to each of the software 603*d* and the software 603*e*." The link 601 is set from the software 603*d* to the speaker 100e and is set from the software 603e to the LEI) lamp 100f The links 601 means that "the speaker 100e outputs audio according to an audio signal supplied by the software 603d" and "the LED lamp 100f emits light according to a signal supplied by the software 603e."

By setting the program in this way, in this example, a sound effect is output from the speaker 100e or light is emitted from the LED lamp 100f when the user (for example, a child) moves his or her hand or leg in a specific pattern. Thus, for example, when the child pretends to be a superhero, the child can have an exciting experience with the sound effect and the light.

Fifth Specific Example

FIG. 16 is an explanatory diagram illustrating a fifth specific example of a linkage operation of the elements in the system illustrated in FIG. 1. Referring to FIG. 16, in this example, the acceleration sensor 100a, the human detection sensor 100c, the camera 100b, and the LED lamp 100f are used among the elements 100. For example, the acceleration sensor 100a, the human detection sensor 100c, and the camera 100b are mounted on a bird table of a garden and the LED lamp 100f is mounted inside a house. In the illustrated example, software 603f for determining that a bird is sitting on the bird table based on detection results of the acceleration sensor 100a and the human detection sensor 100c is further shown. The link 601 is set to be oriented from each of the acceleration sensor 100a and the human detection sensor 100c to the software 303f. The link 601 from the acceleration sensor 100a means that "a value detected by the acceleration sensor 100a is supplied to the software 603f." The link 601 from the human detection sensor 100c means that "a value detected by the human detection sensor 100c is supplied to the software 603f." The software 603f is supplied with, for example, a condition satisfied by a combination of sensor data supplied by the acceleration sensor 100a and the human detection sensor 100c. The link 601 is set to be oriented from the software 603f to each of the camera 100b and the LED lamp 100f. The link 601 to the camera 100b means that "the camera 100b performs photographing based on an output of the software 303f." The link to the LEI) lamp 100f means that "the LED lamp 100f is caused to emit light based on an output of the software 303f."

By setting the program in this way, in this example, when a bird sits on the bird table, a still image or a moving image is automatically photographed by the camera 100b, and thus a user can see what type of bird has come. When the bird sits on the bird table and the LED lamp 100f inside the house thus emits light, the user can come out to the garden to actually see the bird that has come.

Sixth Specific Example

FIG. 17 is an explanatory diagram illustrating a sixth specific example of a linkage operation of the elements in the system illustrated in FIG. 1. Referring to FIG. 17, in this example, the button 100d and the speaker 100e are used among the elements 100. For example, the speaker 100e is disposed in a bedroom and the button 100d is disposed in a lavatory. In the illustrated example, software 603g of an alarm clock is further shown. The link 601 is set from the software 603g to the speaker 100e. The link 601 means that "the speaker 100e outputs audio according to an audio signal output by the software 603 when a set time comes." The link 601 is set from the button 100d to the software 603g. The link 601 means that "an output of an audio signal by the software 603g stops when the button 100d is pressed."

By setting the program in this way, in this example, the sound of the alarm clock output from the speaker 100e disposed in the bedroom does not stop until the button 100d in the lavatory is pressed. Thus, since a situation in which the alarm stops despite the fact that the user is still asleep rarely occurs, the user can reliably wake up at a scheduled time.

2. Embodiments of the Present Disclosure 2-1. Configuration Examples of System

FIG. 18 is a diagram illustrating a configuration example of a system according to an embodiment of the present disclosure. Referring to FIG. 18, a system 1000 includes end user terminals 1100 and servers 1300. The end user terminals 1100 and the servers 1300 are mutually connected via a network 1200.

The end user terminals 1100 are terminal devices used by end users. The end users are, for example, the user of the system 10 described above with reference to FIG. 1 and the like. As will be described below, the end users have a software element, a hardware element, and an execution environment. The end user terminals 1100 exchange, for example, information regarding the elements, such as information regarding purchase of the elements, information regarding a combination method for the elements, and information regarding proposals of new elements, with the servers 1300. The end user terminals 1100 can also download an execution environment or a software element from the servers 1300. The end user terminals 1100 output the information received from the servers 1300 to the users via an output unit such as a display and transmit information corresponding to a manipulation input given from the users via an input unit such as a touch panel, a keyboard, or a mouse to the servers 1300. In the illustrated example, the end user terminals 1100 include a smartphone 1100a, a personal computer 1100b, and a tablet 1100c. However, the end user terminals 1100 are not limited to these devices and can include all kinds of terminal devices capable of realizing the above-described functions.

The servers 1300 supply a service to at least one of the end user terminals 1100. The servers 1300 are configured of one or a plurality of server devices. In the illustrated example, the servers 1300 include server devices 1300a to 1300c, but the number of server devices is not limited to this example. The number of server devices may be singular or may be a number greater than 2 or 3. The servers 1300 can be administered by one service supply entity or a plurality of service supply entities. For example, the servers 1300 can be administered by a service provider managing all of the services, an element or content supplier, a manufacturer, and the like. For example, the server devices 1300a to 1300c in the illustrated example may all be administered by the same service supply entity or may be administered by mutually different service supply entities. A single server apparatus, e.g., the server device 1300a, may be commonly administered by a plurality of service supply entities. The servers 1300 exchange, for example, the information regarding the elements, such as information regarding purchase of the elements, information regarding a combination method for the elements, and information regarding proposals of new elements, with the end user terminals 1100. The servers 1300 may also be able to allow the end user terminals 1100 to download the execution environment or the software element. The servers 1300 transmit information to be output to the users to the end user terminals 1100 and receive information corresponding to a manipulation input given from the users from the end user terminals 1100.

FIG. 19 is a diagram illustrating a functional configuration example of a system according to an embodiment of the present disclosure. Referring to FIG. 19, the end user terminal 1100 includes a communication unit 1110, a control unit 1120, a storage unit 1130, and an input and output unit 1140. The server 1300 includes a communication unit 1310, a control unit 1320, and a storage unit 1330.

In the end user terminal 1100, the communication unit 1110 is realized by a communication device that performs wired or wireless communication and performs communication with the server 1300 via the network 1200. The control unit 1120 is realized by a processing circuit such as a CPU and performs various kinds of calculation to control the entire end user terminal 1100. The storage unit 1130 is realized by a memory or a storage device and stores various kinds of data used by the end user terminal 1100, such as a program causing the control unit 1120 to function. The input and output unit 1140 is realized by an input device such as a touch panel, a keyboard, or a mouse and an output device such as a display. The input and output unit 1140 receives a manipulation input from the user and outputs various kinds of information to the user.

In the server 1300, the communication unit 1310 is realized by a communication device that performs wired or wireless communication and performs communication with the end user terminal 1100 via the network 1200. The control unit 1320 is realized by a processing circuit such as a CPU and performs various kinds of calculation to control the entire server 1300 (or the individual server device). The storage unit 1330 is realized by a memory or a storage device and stores various kinds of data used by the server 1300, such as a program causing the control unit 1320 to function. In the illustrated example, the server 1300 does not include an input and output unit since the server 1300 exclusively provides a service to the end user terminal 1100 according to the program stored in the storage unit 1330. In several examples of the embodiments, however, the server 1300 may include an input and output unit so that a service provider, a supplier, a manufacturer, and the like changes settings of a service or updates information regarding the element.

2-2. Configuration of Service Platform

FIG. 20 is a diagram illustrating a configuration example of a service platform according to an embodiment of the present disclosure. Referring to FIG. 20, a service platform 2200 includes a manager function 2201, an element selling and charging function 2207, a user management function 2209, and an element management function 2211. The service platform 2200 is supplied, for example, to cause the system 10 described above with reference to FIG. 1 and the like to function.

In the service platform 2200, the manager function 2201 can correspond to the function of the manager 200 of the system 10 in the example of FIG. 1. Accordingly, the service platform 2200 can be mounted on, for example, the device of the manager 200 described above with reference to FIGS. 2 to 9. Alternatively, the manager function 2201 is mounted on the device of the manager 200 and, on the other hand, the other functions may be mounted on another device such as the server 300 or the like. The device on which the service platform 2200 is mounted may be the same or may differ among the foregoing end user terminals 1100. The element selling and charging function 2207, the user management function 2209, and the element management function 2211 may be mounted on the end user terminal 1100 or may be mounted on other devices to exchange information with the end user terminal 1100, as necessary. Hereinafter, each constituent element will be described.

The manager function 2201 includes a program management function 2203 and an execution environment 2205. The manager function 2201 manages a hardware element 100$h$ and/or a software element 100$s$ and causes these elements to realize a linkage operation. The program management function 2203 manages a program defining the linkage operation by these elements. More specifically, the program management function 2203 can read a preinstalled program or a program supplied by the server and can update the program, correct the program, generate a new program according to a user's manipulation. The execution environment 2205 causes the hardware element 100$h$ and/or the software element 100$s$ to perform the linkage operation according to the program managed by the program management function 2203.

The element selling and charging function 2207 manages selling and charging of the hardware element 100$h$ and the software element 100$s$. For example, these elements may be sold by sending the body of the hardware element 100$h$ or a medium recording a program of the software element 100$s$ or may be sold by downloading a valid key of the hardware element 100$h$ or the program of the software element 100$s$. The hardware element 100$h$ or the software element 100$s$ may be validated only for a predetermined period by charging. The element selling and charging function 2207 supplies the element management function 2211 with information indicating a state of the selling or the charging of the elements included in the system 10.

The user management function 2209 manages the users of the system 10. As will be described below, in the service according to the embodiment, the elements 100 included in the system 10 are managed for each user and the elements 100 used by the user to construct the system 10 are managed. The user management function 2209 enables the element management function 2211 to specify the elements which can be used by the users in the system 10 by managing the users of the system 10 in conjunction with the element selling and charging function 2207.

The element management function 2211 manages the elements included in the system 10. As described above, the elements include the hardware element 100$h$ and the software element 100$s$. When the hardware element 100$h$ is embedded in the system 10, the body thereof is first necessarily received by the user of the system 10. A software portion embedded in the hardware element 100$h$ may be validated by inputting authentication information through a validation key or the like or by performing a validation manipulation via the execution environment 2205. In this case, the hardware element 100$h$ for which the software portion is not validated is embedded in the system 10 despite the fact that the body thereof is received by the user, but the software portion can be validated and can first be embedded in the system 10.

On the other hand, when the software element 100$s$ is embedded in the system 10, it is necessary for a program module to be downloaded to be received by the user (the manager 200 or the element 100 having a calculation function) or it is necessary for an application program interface (API) of the software element 100$s$ supplied on the server to be available. As in the hardware element 100$h$, a validation order may be necessary in the software element 100s. In this case, the software element 100s can be validated and can first be embedded in the system 10.

The element management function 2211 manages the hardware element 100h of which the body is received by the user and for which the software portion is validated (or the validation order is not necessary) and the software element 100s which is downloaded to be received by the user (or the API on the server is available) and is validated (or the validation order is not necessary) as the elements included in the system 10.

The element management function 2211 may handle a hardware element of which a body is not received by the user or for which a software portion is not validated and a software element which is not downloaded to be received by the user (or an APT on the server is not available) or is not validated as elements not included in the system 10 and may simulate a combination with, for example, the elements included in the system 10. An element not included in the system 10 can also be newly included in the system 10 by selling or charging the element, transmitting the body or acquiring a validation key, or downloading a program.

Information regarding the element not included in the system 10 can be supplied from the server 1300 to the end user terminal 1100, as will be described below. The element management function 2211 can acquire the information from the user terminal 1100 (the element management function 2211 is mounted on the user terminal 1100 in some cases).

2-3. Examples of Exchange of Information Regarding Element

First Example

FIG. 21 is a diagram illustrating a first example of exchange of information regarding elements according to an embodiment of the present disclosure. In the example illustrated in FIG. 21, an end user purchases the element 100 which is sold on the server 1300 of the service provider via the end user terminal 1100. The end user already possesses the execution environment 2205 and an element 100p. In the illustrated example, the end user can use a simulation supplied for the sale on the server 1300 using the end user terminal 1100.

When the simulation is used, the user first inputs a function desired to be realized in the system 10 and/or information regarding the element 100p already possessed by the user with the end user terminal 1100. The end user terminal 1100 transmits the information to the server 1300 (S041). For example, the server 1300 generates simulation information regarding a combination of the elements 100 capable of realizing the function desired to be realized with the system 10 by the user and/or a combination of the elements 100 utilizing the element 100p already possessed by the user and transmits the simulation information to the end user terminal 1100 (S042). The simulation information can include information regarding an element 100q which the user does not yet possess (or which is not available) in the combination of the proposed elements 100 or information regarding a function or the like realized when the combination of the elements 100 is performed on the execution environment 2205.

When the function supplied by the combination of the proposed elements 100 satisfies a request, the user referring to the simulation information using the end user terminal 1100 can purchase the element 100q that he or she does not yet possess. For example, a request for purchasing the element 100q is transmitted from the end user terminal 1100 to the server 1300. The service provider receiving the purchase request with the server 1300 sells the element 100q to the user by sending a hardware element associated with the purchase request and causing a software element to be downloadable. The user who is able to use the element 100q can use the desired function in the system 10 by causing the already possessed element 100p and the newly purchased element 100q to perform a linkage operation in the execution environment 2205.

In the foregoing example, for example, when the simulation information is referred to with the end user terminal 1100, a program defining a linkage operation of the elements associated with the simulation may be downloadable. Thus, for example, when the element 100q can be used through the purchase, the user can realize the linkage operation of the elements without performing a separate setting manipulation or the like of defining the linkage operation. In the execution environment 2205, for example, a communication path of the elements 100p and 100q is set and identifiers of the elements 100p and 100q in the system 10 are decided according to a downloaded program.

Second Example

FIG. 22 is a diagram illustrating a second example of exchange of information regarding elements according to an embodiment of the present disclosure. In the example illustrated in FIG. 22, an end user A uses an end user terminal 1100a to transmit the program defining the linkage operation of the elements 100 in the system 10 to the server 1300 of the service provider (S051). In the second example, information regarding a program supplied here by the end user A is shared with another end user B. More specifically, the information supplied by the end user A is used as simulation information for the end user B.

In the illustrated example, the end user B inputs information regarding a function desired to be realized in the system 10 and/or the element 100p already possessed by the end user B with the end user terminal 1100b. The end user terminal 1100b transmits the information to the server 1300 (S052). Based on the information supplied in S051 from the end user A, the server 1300 generates simulation information regarding a combination of the elements 100 capable of realizing the function desired by the end user B to be realized in the system 10 and/or a combination of the elements 100 utilizing the element 100p already possessed by the user and transmits the simulation information to the end user terminal 1100 (S053). The simulation information can include information regarding the element 100q which the user does not yet possess (or which is not available) in the combination of the proposed elements 100 or information regarding a function or the like realized when the combination of the elements 100 is performed on the execution environment 2205.

When the function supplied by the combination of the proposed elements 100 satisfies a request, the end user B referring to the simulation information using the end user terminal 1100b can purchase the element 100q that he or she does not yet possess, as in the foregoing first example. The user who is able to use the element 100q can use the desired function in the system 10 by causing the already possessed element 100p and the newly purchased element 100q to perform the linkage operation in the execution environment 2205.

Third Example

FIG. 23 is a diagram illustrating a third example of exchange of information regarding elements according to an embodiment of the present disclosure. In the example illustrated in FIG. 23, a server 1300a of a service provider mediates the elements 100 (including content) supplied by a software supplier (server 1300b), a hardware supplier (server 1300c), and a content supplier (1300d).

In the illustrated example, an end user performs simulation using the end user terminal 1100 as in the foregoing first or second example. That is, the end user terminal 1100 transmits information regarding a function desired to be realized in the system 10 by the user and/or the already possessed element 100p to the server 1300a (S061) and the server 1300a transmits simulation information to the end user terminal 1100 (S062). When the function supplied by a combination of the proposed elements 100 satisfies a request, the user referring to the simulation information can purchase the element 100q that he or she does not yet possess. At this time, payment of a price from the end user to the service provider is performed through, for example, a settlement process between the end user terminal 1100 and the server 1300a (S063).

On the other hand, the element 100q purchased by the user in the foregoing process can be an element registered in advance from the servers 1300b to 1300d by the software supplier, the hardware supplier, or the content supplier. For example, the supplier registers the element 100 by transmitting information regarding the specification, the prices, or the like of the element 100 from the servers 1300b to 1300d to the server 1300a (S064). As described above, when the service provider sells the element 100 to the end user, a part of the price paid by the end user is returned from the service provider to the supplier (S065). Methods of returning the price to the supplier can be diverse. For example, a revenue sharing method may be adopted.

Fourth Example

FIG. 24 is a diagram illustrating a fourth example of exchange of information regarding elements according to an embodiment of the present disclosure. In the example illustrated in FIG. 24, an end user A transmits information regarding a function desired to be realized in the system 10 to the server 1300a using the end user terminal 1100a (S071). For example, the end user A may express the function desired to be realized in a format that is not necessarily associated directly with the constituent elements of the system 10, such as a photo or text. The server 1300a publishes a posting from the end user A to other users including the end user B (S072). The end user B referring to the posting generates a program which can realize the function desired by the end user A, defines the linkage operation of the elements 100 in the system 10, and transmits the program from the end user terminal 1100b to the server 1300a (S073).

Based on the information supplied from the end user B, the server 1300a generates simulation information regarding a combination of the elements 100 which can realize the function desired by the end user B in the system 10 and transmits the simulation information to the end user terminal 1100a (S074). At this time, there may be a plurality of users corresponding to the end user B. In this case, a plurality of pieces of simulation information are transmitted from the server 1300a to the end user terminal 1100a. When the function supplied by a combination of the proposed elements 100 satisfies a request, the user referring to the simulation information can purchase the element 100q that he or she does not yet possess. At this time, payment of a price from the end user to the service provider is performed through, for example, a settlement process between the end user terminal 1100 and the server 1300a.

In the illustrated example, as in the foregoing third example, the elements 100 sold by the service provider are registered from the servers 1300b to 1300d by the suppliers (S075). When the service provider sells the element 100 to the end user A, a part of the price paid by the end user A is returned to the supplier (S076). At this time, when the end user A purchases the element 100 based on the information supplied by the end user B, that is, the combination of the elements 100 proposed by the end user B is adopted, a part of the price paid for the element 100 by the end user A may also be returned from the service provider to the end user B. Methods of returning the price to the end user can be diverse. For example, a revenue sharing method may be adopted. The service provider may sell the elements 100 directly to the end users rather than the mediation as in the foregoing first and second examples.

Fifth Example

FIG. 25 is a diagram illustrating a fifth example of exchange of information regarding elements according to an embodiment of the present disclosure, in the example illustrated in FIG. 25, the end user A uses the end user terminal 1100a to register the elements 100 for realizing a certain function in the system 10 and a program defining a linkage operation of the elements in the server 1300a of the service provider as a package PKG (S081). As illustrated, the end user A may not necessarily possess the elements or the program corresponding to the package PKG. For example, the end user A may retain the service platform 2200 including the execution environment 2205 and register the package PKG in the sever 1300a based on a simulation result executed using the service platform 2200 and the end user terminal 1100.

On the other hand, the end user B refers to information regarding the package PKG registered in the server 1300a using the end user terminal 1100b (S082) and purchases the package PKG when there is the package PKG capable of realizing a desired function (S083). The service provider sends the elements 100 included in the package PKG to the end user B and causes the program defining the linkage operation to be downloadable (may store the program in a medium and send the element). When the service provider sells the package PKG to the end user B, a part of the price paid by the end user B is returned from the service provider to the end user A (S084).

FIG. 26 is an explanatory diagram illustrating an example of a package which is sold in the example of FIG. 25. In FIG. 26, a baby monitor kit is shown as an example of a product realized by the package PKG. The baby monitor kit includes an acceleration sensor 100a, a camera 100b, a speaker 100e, an LED lamp 100f, a microphone 100g, and a motor 100m. The acceleration sensor 100a, the speaker 100e, and the microphone 100g are embedded in the casing of a pedestal portion. The camera 100b is mounted on an upper portion of a post. The LED lamp 100f and the motor 100m are embedded in a bird-shaped toy and the motor 100m moves the wings of the bird.

The elements 100 perform a linkage operation according to the program. For example, a remote manipulation is performed with a smartphone or the like so that a baby monitor function of causing the LED lamp 100f to blink, causing the motor 100m to move the wings, and confirming a form with the camera 100b is realized. The program for the linkage operation is downloaded from the server 300 to the elements 100 via the manager 200 for example, when the respective elements 100 are delivered to a source of the end user and the elements are connected to the manager 200 to correspond to an account of the end user. An embodiment of the present disclosure is not limited to the program. For example, content such as a sound material reproduced by the speaker 100e is likewise downloaded from the server 300 to the element 100 via the manager 200.

When the end user B purchases the package PKG in the example described above with reference to FIG. 25, for example, the casing in which the elements 100 are embedded, as illustrated in FIG. 26, is sent from the service provider to the end user B. The casing may be sent in a completed form or may be sent in a form in which it is disassembled into components to be simply assembled. Further, the end user B can download the program from the server 1300a through, for example, the end user terminal 1100b. As described above, for example, the downloaded program is downloaded from the manager 200 to the elements 100 so that the above-described linkage operation of the elements 100 can be performed.

In the embodiment, even the elements 100 sold as the package PKG can perform a linkage operation in a combination of other elements 100 if the program is reset. For example, when the element such as the acceleration sensor 100a or the camera 100b is detached from the casing and another program is installed via the manager 200 in the foregoing example, a different function from the baby monitor can be realized by performing a linkage operation in a different combination of the elements 100 from that of the foregoing example. Even when the function of the baby monitor is continuously used, the function can be easily upgraded or customized by updating the program installed in each element 100 via the manager 200.

Sixth Example

FIG. 27 is a diagram illustrating a sixth example of exchange of information regarding elements according to an embodiment of the present disclosure. In the example illustrated in FIG. 27, a hardware manufacturer posts ideas of new elements 100 from a server 1300e to the server 1300a of the service provider (S101). At this time, the hardware manufacturer may post examples of functions realized using the new elements 100 together.

The service provider publishes the posted ideas of the new elements 100 and the examples of the functions realized using the new elements 100 using the server 1300a. A plurality of end users browse the published ideas using the end user terminals 1100a to 1100c (in practice, more end user terminals may be used) (S102). When the end users intend to purchase the elements 100 of the published ideas, the end users express such intention using the end user terminals 1100a to 1100c (S103). At this time, the end users may express functions desired to be used by the end users in the examples of the functions realized using the new element 100.

Alternatively, the end users may newly propose functions realized using the new elements 100. The functions newly proposed by the end users may be published along with the ideas of the new elements 100 posted by the hardware manufacturer. Thus, the end user can give the element 100 that he or she wishes to own an added value known as a useful function and the other end users can express an intention to purchase, thereby increasing a probability of the element 100 being manufactured.

When the intention to purchase is expressed by a number of end users equal to or greater than a predetermined number (S104), the hardware manufacturer manufactures the new element 100. In this case, the end user may pay the price when the end user expresses the intention to purchase and a part of the price may be used to manufacture the new element 100. Alternatively, the end user may purchase the element 100 and pay the price after the element 100 is manufactured. The hardware manufacturer may manufacture, for example, a program realizing a function for which many end users have expressed the intention to use among the functions realized using the new elements 100 along with the new element 100.

FIGS. 28A and 28B are explanatory diagrams illustrating how a structure such as that of the example of FIG. 27 is superior.

FIG. 28A illustrates an example of a case in which purchase applicants are collected in units of products. In this case, for example, purchase applicants of a product A including an element 100x and an element 100y (portions corresponding to the elements 100x and 100y), a product B including the element 100x and an element 100z (portions corresponding to the elements 100x and 100z), and a product C including the element 100x and an element 100w (portions corresponding to the elements 100x and 100w) are collected individually. In the illustrated example, it is assumed that it is difficult to manufacture the products unless, for example, 1000 purchasers are collected. Then, since the number of purchasers of all of the products is less than 1000, it is difficult to manufacture the products.

FIG. 28B illustrates an example of a case in which purchase applicants are collected in units of elements using the same structure as that of the example of FIG. 27. In this case, for example, when the elements 100y, 100z, and 100w are already circulated, the purchase applicants of the element 100x may be collected. Then, a sum of the consumers of the product A (the elements 100x and 100y), the product B (the elements 100x and 100z), and the product C (the elements 100x and 100w) is the number of purchasers of the element 100x. Accordingly, even when the number of consumers of each product is less than 1000, the number of purchasers of the element 100x which is the sum of the consumers of the products exceeds 1000, and thus the element 100x can be manufactured.

Seventh Example

FIG. 29 is a diagram illustrating a seventh example of exchange of information regarding elements according to an embodiment of the present disclosure. In the example illustrated in FIG. 29, the end user A posts ideas of new elements 100 to the server 1300a of the service provider using the end user terminal 1100a (S121). At this time, the end user A may post examples of functions realized using the new elements 100 together.

The service provider publishes the posted ideas of the new elements 100 and the examples of the functions realized using the new elements 100 using the server 1300a. A plurality of end users browse the published ideas using the end user terminals 1100b and 1100c (in practice, more end user terminals may be used) (S122). When the end users intend to purchase the elements 100 of the published ideas, the end users express such intention using the end user terminals 1100a to 1100c (S123). At this time, the end users may express functions desired to be used by the end users in the examples of the functions realized using the new element 100. Alternatively, the end users may newly propose functions realized using the new elements 100 and the suggested functions may be published along with the ideas of the new elements 100.

When a number of end users equal to or greater than a predetermined number express an intention to purchase the new element 100, manufacture thereof is entrusted to the hardware manufacturer (S124). In this case, the end user may pay the price when the end user expresses the intention to purchase and a part of the price may be used to manufacture the new element 100. Alternatively, the end user may purchase the element 100 and pay the price after the element 100 is manufactured. The hardware manufacturer may manufacture, for example, a program realizing a function for which many end users have expressed the intention to use among the functions realized using the new elements 100 along with the new element 100. The manufactured elements 100 or program are supplied to the end users via the service provider (S125).

At this time, parts of the prices paid by the other end users purchasing the elements 100 are returned to the end user A supplying the ideas of the elements 100 (S126). The server 1300*a* of the service provider may decide a return ratio of the price to the end user A according to creativity of the idea, contribution of a case in which there are a plurality of initiators, or the like.

2-4. Conclusion of Embodiment

An embodiment of the present disclosure described above can be expressed as follows.

(1) A method including supplying a hardware or software element, supplying a program causing the element to perform a linkage operation, and realizing a function by causing the element disposed in an execution environment to perform the linkage operation according to the program, wherein the element and the program are able to be mutually independently supplied.

In the system 10 according to the embodiments, the software or hardware elements 100 are supplied. The programs (for example, the program defining the linkage operation between the elements 100, as conceptually shown in FIGS. 12 to 17) causing the elements to perform the linkage operation can be mutually independently supplied separately from the elements 100.

Thus, by changing the combination of the elements 100 or changing the program in the combination of the elements 100, it is possible to realize a wide variety of functions. Accordingly, a function more suitable for the user can be easily realized. For example, as illustrated in the example of FIG. 21, the end user can additionally purchase the elements 100 in sequence, as necessary. A simulation realizing a certain function when the elements 100 are additionally purchased may be supplied to, for example, the server 1300 administered by the service provider.

(2) The supplying of the program may include uploading a program generated by a first end user to a server, and downloading, by a second end user different from the first end user, the uploaded program from the server. The program causing the elements 100 to perform the linkage operation in the system 10 can be generated by the end user. In the execution environment of the system 10, the end user may change the program or a GUI for generating a new program may be supplied. For example, as illustrated in the example of FIG. 22, the program generated by a certain end user may be uploaded to the server 1300 of the service provider and the program may be downloaded by another end user to be used for the linkage operation of the elements 100.

(3) The supplying of the element may include uploading information regarding the element manufactured by suppliers to a server of a mediator, and purchasing, by an end user, the element with reference to the uploaded information regarding the element.

The provider of the service in the embodiment may include the supplier of the hardware or software element and the mediator mediating circulation of the element. For example, as illustrated in the example of FIG. 23, the mediator publishes information regarding the elements supplied by the suppliers to the end users, so that the end users can easily receive various elements. The suppliers can also supply the elements to many end users.

(4) The supplying of the program may include uploading information regarding a function that a first end user desires to realize to a server, uploading, to the server, a program that is generated by a second end user different from the first end user with reference to the uploaded information regarding the function and is capable of realizing the function, and downloading, by the first end user, the uploaded program from the server. For example, as illustrated in the example of FIG. 24, a new program may be generated by an end user based on information which is supplied from other end users regarding a function desired to be realized. In this case, when another end user purchases the new element 100 to realize the function according to the new program, a part of the price of the element 100 may also be returned to the end user generating the new program.

(5) The supplying of the element and the supplying of the program may include purchasing, by a second end user different from a first end user, a package of a program generated by the first end user and the element associated with the program. As described above, the elements 100 and the program may be mutually independently supplied. However, for example, as illustrated in the example of FIG. 25, the elements may be packaged and supplied. Even in this case, for example, when the function of a product supplied as the package is not necessary, a separate function necessary in the element 100 can be realized by changing the combination of the elements 100 or changing the program for the linkage operation.

(6) The package may include the hardware element to be delivered, and the software element and the program to be stored in a medium and delivered or to be downloaded. For example, as illustrated in the example of FIG. 26, the package can include the hardware and software elements 100 and the program causing the elements 100 to perform the linkage operations. For example, the hardware elements may be delivered, and the software elements and the program may be stored in a medium to be delivered or downloaded. In this way, the method of sending the elements 100 or the program from the service provider to the source of the end user may be diverse and a plurality of supply methods may be used together even in the same package.

(7) The supplying of the element may include uploading, by a manufacturer of the element, a proposal of a new element to a server, transmitting, by end users referring to the proposal, expressions of intention to purchase the new element to the server, manufacturing, by the manufacturer, the new element when the predetermined number of the expressions of the intention are transmitted, and selling the manufactured element to the end users transmitting the expressions of the intention. For example, as illustrated in the example of FIG. 27, the manufacturers of the elements 100 can collect purchase applicants of the new elements 100 by uploading the proposals of new elements 100 to the server 1300. The manufacturers can develop the new elements 100 at low risk by manufacturing the new elements 100 under the condition that a predetermined number of purchase applications are collected.

(8) A plurality of different functions may be realizable by combining the new element with another existing element. For example, as described with reference to FIGS. 28A and 28B, when a plurality of different functions (corresponding to a plurality of different products) can be realized by combining the new element 100x with the existing elements 100y, 100z, and 100w or the like, a wide range of purchase applicants can be collected by setting the elements 100 as units, as described above.

(9) The supplying of the element may include uploading, by an end user, a proposal of a new element to a server, transmitting, by end users referring to the proposal, expressions of intention to purchase the new element to the server, manufacturing, by a manufacturer of the element, the new element when the predetermined number of the expressions of the intention are transmitted, and selling the manufactured element to the end users transmitting the expressions of the intention. For example, as described with reference to FIG. 29, the new element may be proposed not by the manufacturer but on an end user side. In this case, when a predetermined number of users approving of the proposal are collected, the service provider provides the manufacturer with a request to manufacture the element 100 so that the element 100 of which a demand is higher can be newly added.

3. Hardware Configuration

Next, a hardware configuration of an information processing apparatus according to an embodiment of the present disclosure will be described with reference to FIG. 30. FIG. 30 is a block diagram illustrating a hardware configuration example of an information processing apparatus according to an embodiment of the present disclosure. An information processing apparatus 900 illustrated in the drawing can realize, for example, the element, the manager, the server, the UI device, an end user terminal and/or the server device in the above-described embodiments.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor) or ASIC (Application Specific Integrated Circuit), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 is a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as an LCD (Liquid Crystal Display), a PDP (Plasma Display Panel), and an organic EL (Electro-Luminescence) displays, an audio output device such as a speaker or a headphone, and a peripheral device such as a printer. The output device 917 may output the results obtained from the process of the information processing apparatus 900 in a form of a video such as text or an image, and an audio such as voice or sound.

The storage device 919 is a device for data storage which is configured as an example of a storage unit of the information processing apparatus 900. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (registered trademark) (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

4. Supplement

The embodiments of the present disclosure may include the information processing apparatus (end user terminal and/or server device), the system, the information processing method executed in the information processing apparatus or the system, the program for causing the information processing apparatus to function, and the non-transitory tangible media having the program recorded thereon, which have been described above, for example.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A system comprising: circuitry configured to store functional information indicating a capability of each of a plurality of elements located remotely from the system; identify a function capable of being performed by linking a plurality of the elements based on the stored functional information; and transmit information corresponding to the identified function capable of being performed by linking the plurality of elements to a first device remote from the system.

(2)

The system of (1), wherein the circuitry is configured to: generate a program corresponding to the identified function capable of being performed by linking the plurality of the elements; and transmit the program to the first device.

(3)

The system of any of (1) to (2), wherein the circuitry is configured to: receive information corresponding to a desired function to be performed by linking a subset of the plurality of the elements; generate information indicating the subset of the plurality of elements necessary to perform the desired function; and transmit the generated information to the first device.

(4)

The system of any of (1) to (3), wherein the circuitry is configured to: receive information identifying a function capable of being performed by linking a subset of the plurality of elements from the first device; and transmit information identifying the function capable of being performed linking the subset of the plurality of elements to a second device remote from the system.

(5)

The system of (4), wherein the circuitry is configured to: generate a program to be executed to perform the function capable of being performed by linking the subset of the plurality of elements; and transmit the program to be executed to the second device.

(6)

The system of any of (1) to (5), wherein the circuitry is configured to: receive, from the first device, information corresponding to a desired function to be performed and a subset of the plurality of elements associated with the first device; identify at least a first element not associated with the first device necessary to perform the desired function; retrieve a cost associated with acquiring the at least first element; and transmit the cost associated with acquiring the at least first element to the first device.

(7)

The system of (6), wherein the circuitry is configured to retrieve the cost associated with acquiring the at least first element from a second device remote from the system.

(8)

The system of any of (1) to (7), wherein the circuitry is configured to: receive, from the first device, information corresponding to a desired function to be performed by linking a subset of the plurality of elements associated with the first device; share information corresponding to the desired function with a second device remote from the system; and receive, from the second device, information indicating a linkage between the subset of the plurality of elements to perform the desired function.

(9)

The system of any of (1) to (8), wherein the circuitry is configured to: receive, from the first device, information corresponding to a desired function to be performed; share information corresponding to the desired function with a second device remote from the system; and receive, from the second device, information identifying a subset of the plurality of elements to perform the desired function and a linkage between the subset of the plurality of elements.

(10)

The system of (9), wherein the circuitry is configured to: identify that at least one of the subset of the plurality of elements is purchased based on the information received from the second device; identify a cost associated with the at least one of the subset of the plurality of elements; and reimburse a user associated with the second device with at least a portion of the cost associated with the at least one of the subset of the plurality of elements.

(11)

The system of any of (1) to (10), wherein the circuitry is configured to: receive, from a second device remote from the system, information identifying a function capable of being performed by linking a subset of the plurality of elements; identify that the first device purchased at least a one of the subset of the plurality of elements based on the information identifying the first function received from the second device; and reimburse a user associated with the second device with at least a portion of the cost associated with the at least one of the subset of the plurality of elements.

(12)

The system of any of (1) to (11), wherein the circuitry is configured to receive, from a second device remote from the system, a plurality of functions capable of being performed by linking respective subsets of the plurality of elements.

(13)

The system of any of (1) to (12), wherein the circuitry is configured to transmit, to the first device, the plurality of functions capable of being performed by linking respective subsets of the plurality of elements.

(14)

The system of any of (1) to (13), wherein the circuitry is configured to: store an application configured to link the subset of the plurality of elements to perform the function; and transmit the application to the first device.

(15)

The system of (14), wherein the application includes a user interface configured to be displayed by the first device and accept a user input to configure the linkage between the plurality of elements.

(16)

The system of any of (1) to (15), wherein the system is a server.

(17)

The system of any of (1) to (15), wherein the system is a plurality of servers.

(18)

The system of any of (1) to (18), wherein the plurality of elements are each software elements configured to be communicatively coupled to the first device.

(19)

The system of any of (1) to (18), wherein the plurality of elements are each hardware elements configured to be communicatively coupled to the first device.

(20)

A method performed by an information processing system, the method comprising: identifying a function capable of being performed by linking a plurality of elements located remotely from the information processing system based on stored functional information indicating a capability of each of the plurality of elements; and transmitting information corresponding to the identified function capable of being performed by linking the plurality of elements to a first device remote from the information processing system.

(21)

A non-transitory computer readable medium including computer program instructions, which when executed by an information processing system, cause the information processing system to: identify a function capable of being performed by linking a plurality of elements located remotely from the system based on stored functional information indicating a capability of each of the plurality of elements; and transmit information corresponding to the identified function capable of being performed by linking the plurality of elements to a first device remote from the system.

(22)

A method including:
supplying a hardware or software element;
supplying a program causing the element to perform a linkage operation; and
realizing a function by causing the element disposed in an execution environment to perform the linkage operation according to the program,
wherein the element and the program are able to be mutually independently supplied.

(23)

The method according to (22), wherein the supplying of the program includes
uploading a program generated by a first end user to a server, and
downloading, by a second end user different from the first end user, the uploaded program from the server.

(24)

The method according to (22) or (23), wherein the supplying of the element includes
uploading information regarding the element manufactured by suppliers to a server of a mediator, and
purchasing, by an end user, the element with reference to the uploaded information regarding the element.

(25)

The method according to any one of (22) to (24), wherein the supplying of the program includes
uploading information regarding a function that a first end user desires to realize to a server,
uploading, to the server, a program that is generated by a second end user different from the first end user with reference to the uploaded information regarding the function and is capable of realizing the function, and
downloading, by the first end user, the uploaded program from the server.

(26)

The method according to any one of (22) to (25), wherein the supplying of the element and the supplying of the program include
purchasing, by a second end user different from a first end user, a package of a program generated by the first end user and the element associated with the program.

(27)

The method according to (26), wherein the package includes the hardware element to be delivered, and the software element and the program to be stored in a medium and delivered or to be downloaded.

(28)

The method according to any one of (22) to (27), wherein the supplying of the element includes
uploading, by a manufacturer of the element, a proposal of a new element to a server, transmitting, by end users referring to the proposal, expressions of intention to purchase the new element to the server, manufacturing, by the manufacturer, the new element when the predetermined number of the expressions of the intention are transmitted, and selling the manufactured element to the end users transmitting the expressions of the intention.

(29)

The method according to (28), wherein a plurality of different functions are realizable by combining the new element with another existing element.

(30)

The method according to any one of (22) to (29), wherein the supplying of the element includes uploading, by an end user, a proposal of a new element to a server, transmitting, by end users referring to the proposal, expressions of intention to purchase the new element to the server, manufacturing, by a manufacturer of the element, the new element when the predetermined number of the expressions of the intention are transmitted, and selling the manufactured element to the end users transmitting the expressions of the intention.

(31)

A system including:

a terminal device used by an end user; and a server administered by a service provider, wherein the terminal device and the server perform communication to supply, from the provider to the end user, a hardware or software element and a program causing the element to perform a linkage operation, wherein a function is realized by causing the element disposed in an execution environment to perform the linkage operation according to the program, and wherein the element and the program are able to be mutually independently supplied.

REFERENCE SIGNS LIST 10 system
100 element
110 communication unit
120 control unit
130 function unit
140 power unit
200 manager
210 communication unit
220 control unit
230 storage unit
300 server
310 communication unit
320 control unit
330 storage unit
400 UI device
410 communication unit
420 control unit
430 input and output unit
1100 end user terminal
1300 server
2200 service platform

The invention claimed is:

1. A server comprising:
circuitry that:
receives and stores functional information indicating a capability of each of a plurality of hardware elements located remotely from the server, the plurality of hardware elements including at least a first hardware element including a microphone function and one or more second hardware elements including at least one of a display function, a lamp function, and a speaker function;

identifies a linkage operation capable of being performed by linking the first hardware element and the one or more second hardware elements to each other via a network based on the stored functional information;

generates application instruction based on the first hardware element and the one or more second hardware elements capable of being linked; and transmits, to the first hardware element or the linked one or more second hardware elements, the application instruction corresponding to the identified linkage operation capable of being performed.

2. The server according to claim 1, wherein the circuitry acquires the functional information from an external service.

3. The server according to claim 2, wherein the functional information includes a weather forecast or news.

4. The server according to claim 2, wherein the circuitry enables a user to add to the functional information at any time.

5. A system comprising:
a first hardware element including a microphone function;
one or more second hardware elements including at least one of a display function, a lamp function, and a speaker function; and
a server that
receives and stores functional information indicating a capability of a plurality of hardware elements located remotely from the server and including the first hardware element and the one or more second hardware elements, identifies a linkage operation capable of being performed by linking the first hardware element and the one or more second elements to each other via a network based on the stored functional information, generates application instruction based on the first hardware element and the one or more second hardware elements capable of being linked, and transmits, to the first hardware element or the linked one or more second hardware elements, the application instruction corresponding to the identified linkage operation capable of being performed.

6. The system according to claim 5, wherein the first hardware element is configured to transmit an audio data such as voice or sound to the server.

7. The system according to claim 5, wherein the first hardware element is configured to receive the application instruction from the server and transmit the received application instruction to the one or more second hardware elements.

8. The system according to claim 5, wherein the first hardware element is further configured to perform a speaker function.

9. The system according to claim 5, wherein the first hardware element is further configured to perform a display function.

10. The system according to claim 5, wherein the first hardware element is further configured to perform a camera function.

11. The system according to claim 5, wherein the one or more second hardware elements is configured to perform the identified function after receiving the application instruction.

12. The system according to claim 5, wherein the one or more second hardware elements performs the display function using an included Liquid Crystal Display (LCD).

13. The system according to claim 5, wherein the one or more second hardware elements performs the lamp function using an included Light Emitting Diode (LED).

14. The system according to claim 5, wherein the first hardware element includes a function to output video or audio information based on the application instruction.

15. The system according to claim 5, wherein at least one of the one or more second hardware elements includes a function to output video or audio information based on the application instruction.

16. The system according to claim 5, wherein the server is configured to add a third element to the one or more second hardware elements at any time, the third element including at least one of the display function, the lamp function, or the speaker function.

17. A server comprising:
circuitry that:
receives and stores functional information indicating a function of each of a plurality of hardware elements located remotely from the server, the plurality of hardware elements including at least a first hardware element including a microphone function and one or more second hardware elements including at least one of a display function, a lamp function, and a speaker function;
identifies a linkage operation capable of being performed by linking the first hardware element and the one or more second hardware elements to each other via a network based on the stored functional information;
generates application instruction based on the first hardware element and the one or more second hardware elements capable of being linked; and
transmits, to the first hardware element or the linked one or more second hardware elements, the application instruction corresponding to the identified linkage operation capable of being performed.

18. The server according to claim 17, wherein the circuitry acquires the functional information from an external service.

19. The server according to claim 18, wherein the functional information includes a weather forecast or news.

20. The server according to claim 18, wherein the circuitry enables a user to add to the functional information at any time.

21. The server according to claim 1, wherein the linkage operation causes a first one of the linked hardware elements to perform an operation based on information provided by a second one of the linked hardware elements.

22. The system according to claim 5, wherein the linkage operation causes a first one of the linked hardware elements to perform an operation based on information provided by a second one of the linked hardware elements.

23. The server according to claim 17, wherein the linkage operation causes a first one of the linked hardware elements to perform an operation based on information provided by a second one of the linked hardware elements.

* * * * *